(12) United States Patent
Kawai et al.

(10) Patent No.: US 8,861,853 B2
(45) Date of Patent: Oct. 14, 2014

(54) FEATURE-AMOUNT CALCULATION APPARATUS, FEATURE-AMOUNT CALCULATION METHOD, AND PROGRAM

(75) Inventors: Fumi Kawai, Kanagawa (JP); Keisuke Hayata, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 384 days.

(21) Appl. No.: 13/318,553

(22) PCT Filed: Mar. 17, 2011

(86) PCT No.: PCT/JP2011/001576
§ 371 (c)(1),
(2), (4) Date: Nov. 2, 2011

(87) PCT Pub. No.: WO2011/114736
PCT Pub. Date: Sep. 22, 2011

(65) Prior Publication Data
US 2012/0051638 A1    Mar. 1, 2012

(30) Foreign Application Priority Data
Mar. 19, 2010    (JP) .................................. 2010-065246

(51) Int. Cl.
*G06K 9/00* (2006.01)
*G06K 9/32* (2006.01)
*G06K 9/46* (2006.01)

(52) U.S. Cl.
CPC ...... *G06K 9/3241* (2013.01); *G06K 2009/4666* (2013.01); *G06K 9/4642* (2013.01)
USPC ....................................................... 382/170

(58) Field of Classification Search
USPC ................................................. 382/169–172
See application file for complete search history.

(56) References Cited

U.S. PATENT DOCUMENTS

| | | | |
|---|---|---|---|
| 6,259,803 B1 * | 7/2001 | Wirtz et al. | 382/103 |
| 6,445,832 B1 * | 9/2002 | Lee et al. | 382/266 |
| 7,023,487 B1 * | 4/2006 | Adams | 348/448 |
| 8,121,348 B2 | 2/2012 | Hayasaka et al. | |
| 2006/0233443 A1 * | 10/2006 | Wang et al. | 382/199 |

(Continued)

FOREIGN PATENT DOCUMENTS

| | | |
|---|---|---|
| CN | 101479766 | 7/2009 |
| JP | 2009-510542 | 3/2009 |

OTHER PUBLICATIONS

Kobi Levi et al., "Learning Object Detection from a Small Number of Examples: the Importance of Good Features", Proceedings of the 2004 IEEE Computer Society Conference on Computer Vision and Pattern Recognition (CVPR '04), pp. 53-60 (2004).

(Continued)

*Primary Examiner* — Jingge Wu
(74) *Attorney, Agent, or Firm* — Greenblum & Bernstein, P.L.C.

(57) ABSTRACT

A feature amount calculation apparatus calculates a feature amount of a target object from image data, and is provided with: a feature value calculator that calculates an edge direction and edge magnitude as input image data pixel-unit feature values; a feature amount calculator that has an edge direction group calculator that calculates a group of edge directions, and a correlation value calculator that takes all pixels or predetermined pixels among a plurality of pixels used in feature value calculation as pixels subject to correlation value calculation and calculates an edge magnitude correlation value between the pixels subject to correlation value calculation for each feature value; and a histogram creator that counts feature amounts in a histogram for each correlation value, and creates a histogram as a feature vector.

5 Claims, 23 Drawing Sheets

(56) References Cited

U.S. PATENT DOCUMENTS

| | | | |
|---|---|---|---|
| 2007/0237387 A1* | 10/2007 | Avidan et al. | 382/159 |
| 2009/0148014 A1* | 6/2009 | Kanda | 382/128 |
| 2009/0324009 A1* | 12/2009 | Schulz | 382/103 |
| 2010/0226532 A1 | 9/2010 | Hayasaka et al. | |
| 2011/0013804 A1* | 1/2011 | Porikli et al. | 382/103 |
| 2011/0243434 A1 | 10/2011 | Cao | |

OTHER PUBLICATIONS

China Office action, dated Feb. 28, 2014 (English translation).

N. Dalai et al., "Histogram of Oriented Gradients for Human Detection", IEEE Computer Vision and Pattern Recognition, vol. 1, 2005, pp. 886-893.

P. Viola et al., "Detecting pedestrians using patterns of motion and appearance", IEEE International Conference on Computer Vision, 2003.

T.Watanabe et al., "Co-occurrance Histograms of Oriented Gradients for Pedestrian Detection", Pacific-Rim Symposium on Image and Video Technology, 2009.

Takayoshi Yamashita, "Buttal Ninshiki ni Challenge", Image Lab, vol. 20. No. 1, Jan. 10, 2009, pp. 53-58.

Takuya Kawamura, "Saikin no Shinbun to de Hodo sareta Gijutsu Joho o Fukameru, News Kaisetsu", The Journal of the Institute of Electronics, Information and Communication Engineers vol. 93, No. 3, Mar. 1, 2010, pp. 268-269.

* cited by examiner

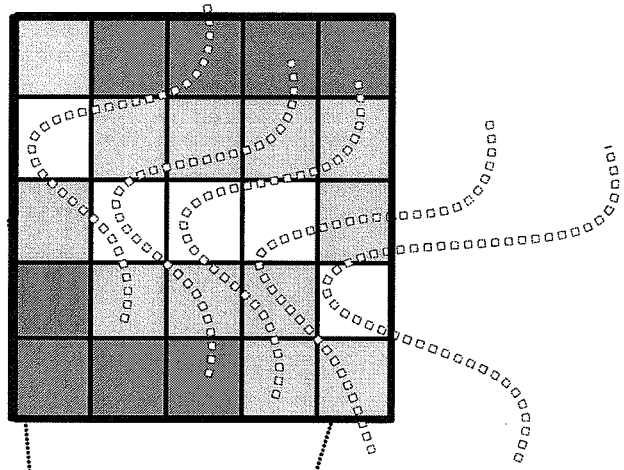
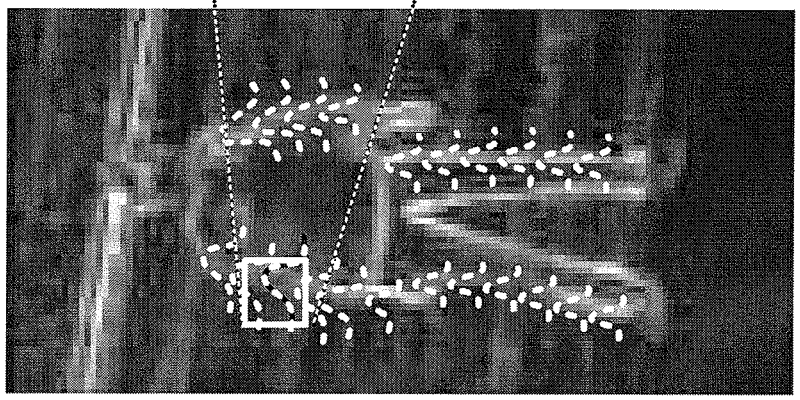
FIG.7B
FIG.7A

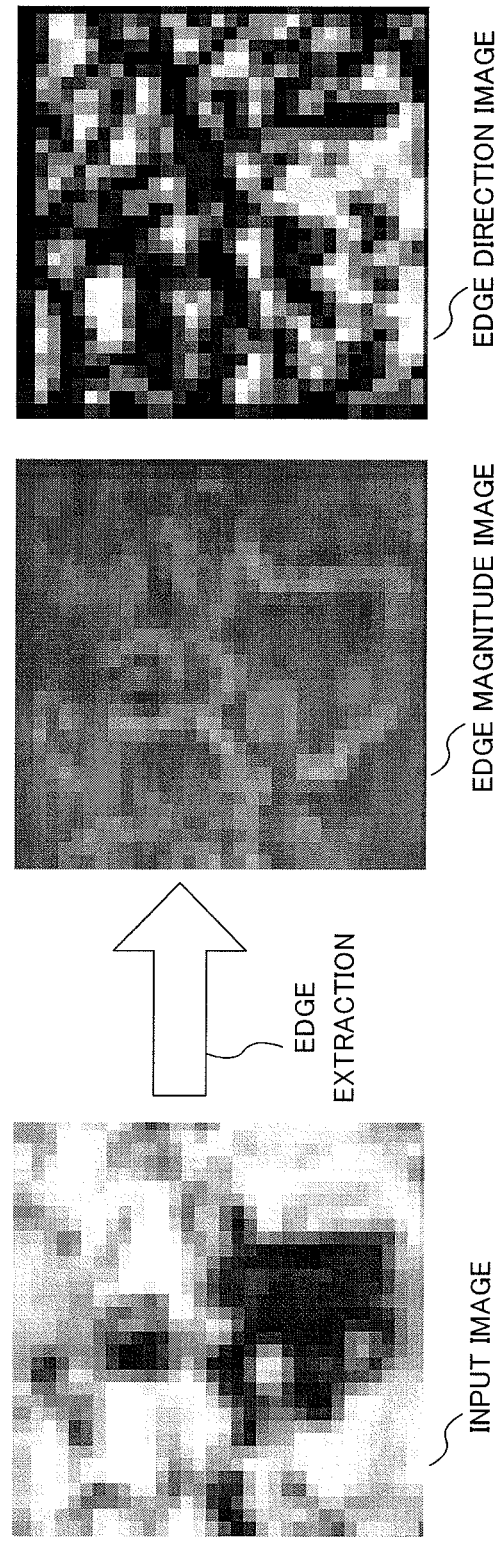

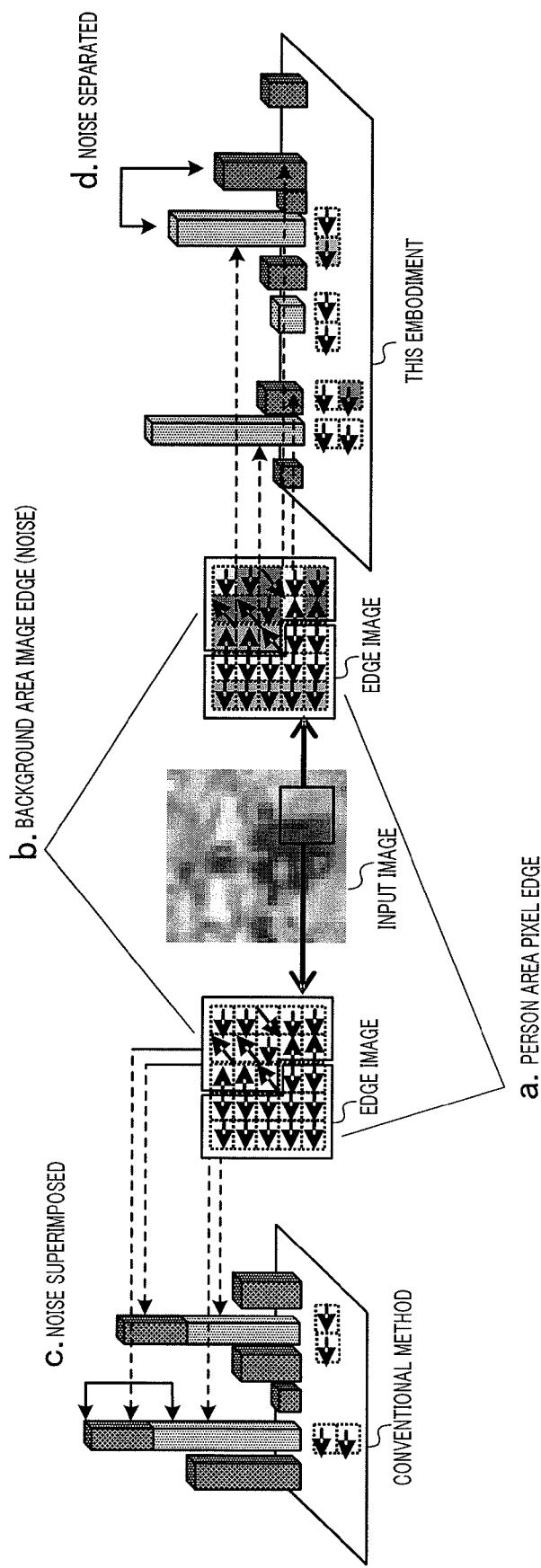

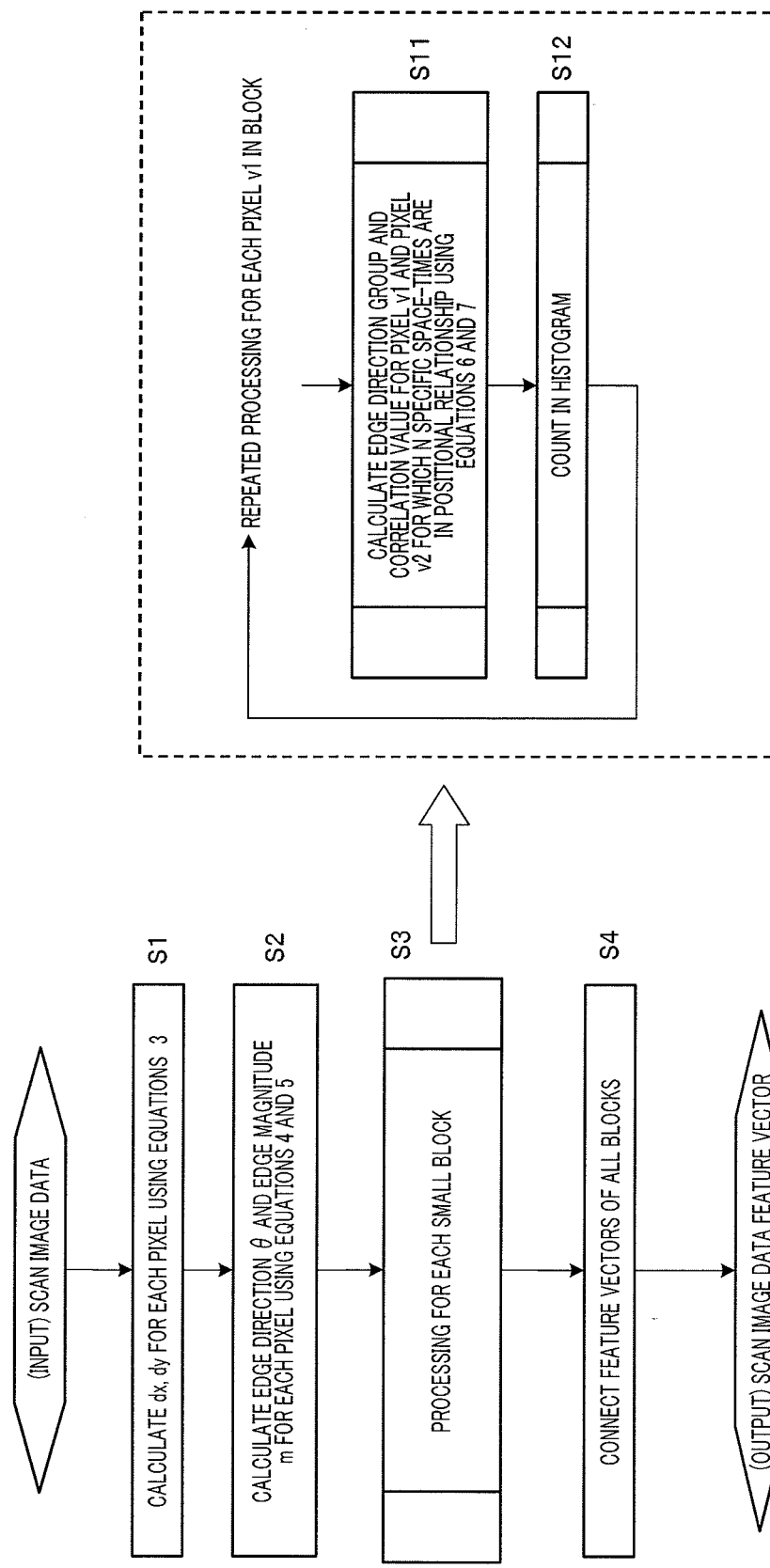

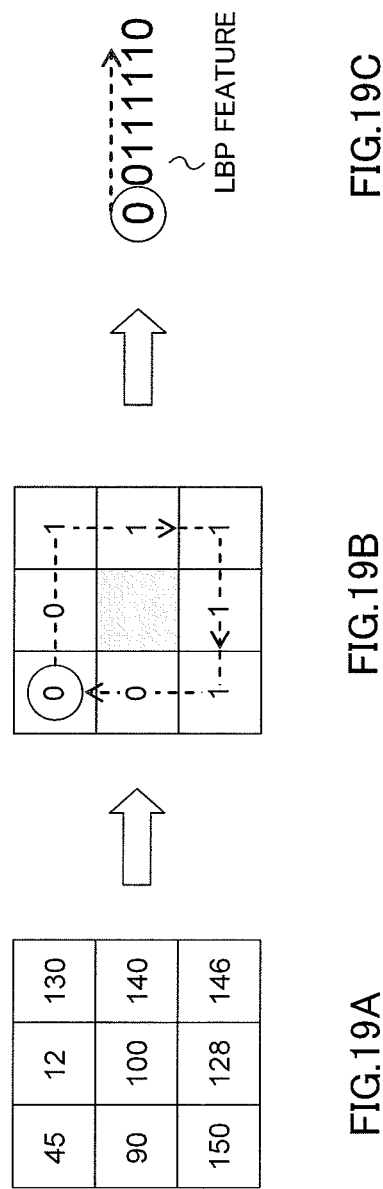

$(\theta_{v1}, \theta_{v2}) = (2°, 80°) = (0, 1)$

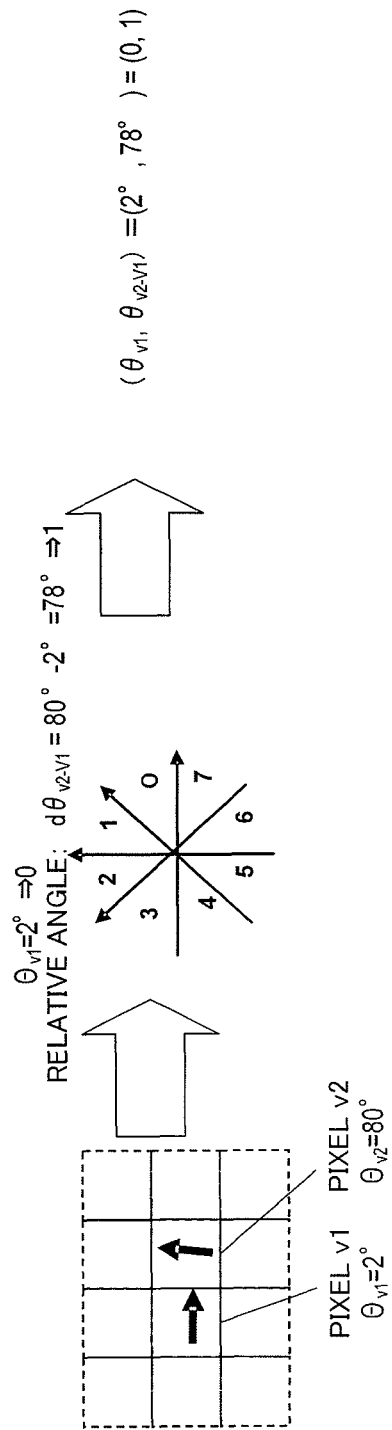

FEATURE-AMOUNT CALCULATION APPARATUS, FEATURE-AMOUNT CALCULATION METHOD, AND PROGRAM

TECHNICAL FIELD

The present invention relates to a feature amount calculation apparatus, and feature amount calculation method and program, that, in particular, sense and detect the position and presence of a target object (hereinafter referred to as "object") from an image in the computer vision field.

BACKGROUND ART

A technology that detects a position of a person shown in an image is expected to be used in a variety of applications, such as video monitoring systems, vehicle driving support systems and automatic annotation systems for images and video, and such technology has been subject to extensive research and development in recent years.

In a scanning frame search type of detection method, an input image is finely raster-scanned using a variable-size rectangular scanning frame, an image feature within the scanned scanning frame is extracted, and it is determined whether or not a target object is shown in the scanning frame using a discriminator that has learned separately offline. Depending on the input image size, the number of scans per image ranges from tens of thousands to hundreds of thousands, and therefore a feature amount and the discriminator's processing computation amount greatly affects the detection processing speed. Consequently, selection of a low-cost feature amount effective for discrimination of a target object is an important factor affecting detection performance, and various feature amounts have been proposed for individual detection target objects, such as faces, people, and vehicles.

Generally, a sliding window method is widely used as an object detection method (see Non-Patent Literature 1 and Patent Literature 1, for example). In a sliding window method, an input image is finely raster-scanned using a rectangular scanning frame (window) of a prescribed size, an image feature is extracted from an image within each scanned window, and it is determined whether or not a person is shown in a target window. Objects of various sizes are detected by enlarging or reducing a window or input image by a predetermined ratio. A feature amount is extracted from each scanned window, and based on an extracted feature amount it is determined whether or not this is a detection target object. The above description refers to a still image, but the situation is similar for moving image processing using feature amounts in preceding and succeeding frames in the time domain, for instance, as in Non-Patent Literature 2.

One important factor affecting detection accuracy is a feature amount used in determining whether or not an object is a person, and various feature amounts have hitherto been proposed. A typical feature amount is a histogram of oriented gradients (hereinafter referred to as "HOG") feature amount proposed by Dalal et al. in Non-Patent Literature 1. An HOG is a feature amount obtained by dividing a window image of a prescribed size into small areas and creating a histogram of edge direction values within a local area. An HOG captures a silhouette of a person by using edge direction information and has an effect of permitting local geometric changes by extracting a histogram feature for each small area, and shows that excellent detection performance is achieved even for an INRIA data set that includes various attitudes (described in Non-Patent Literature 1).

Patent Literature 1 is proposed as an improvement on the method in Non-Patent Literature 1. In Non-Patent Literature 1, an input window image is divided into small areas of a fixed size and an edge direction histogram is created from each of those small areas, whereas in Patent Literature 1 a method is proposed whereby various feature amounts are provided by making the small area size variable, and furthermore an optimal feature amount combination for discrimination is selected by means of boosting.

There is also Non-Patent Literature 3 as an improvement on the method in Non-Patent Literature 1. In Non-Patent Literature 1, edge directions are quantized into eight or nine directions, and an edge direction histogram is created for each angle. In Non-Patent Literature 3, in addition to an edge direction value of each pixel, co-occurrence histograms of oriented gradients (hereinafter referred to as "coHOG") features are proposed in which an edge direction combination between two pixels is improved so as also to create a histogram for each 30-offset positional relationship.

FIG. 1 is a drawing explaining an HOG feature amount and coHOG feature amount. FIG. 1A shows an input image that is a scanning frame image, FIG. 1B shows an edge image, and FIG. 1C shows edge gradient histogram features.

An HOG and coHOG both extract a feature amount from an edge image calculated from brightness I of an input image. An edge image comprises edge gradient θ and edge magnitude mag, and is found by means of equations 1 below.

[1]

$$d_x(x, y) = I(x+1, y) - I(x-1, y)$$
$$d_y(x, y) = I(x, y+1) - I(x, y-1)$$
$$mag(x, y) = \sqrt{d_x(x, y)^2 + d_y(x, y)^2}$$
$$\theta(x, y) = \tan^{-1} \frac{d_y(x, y)}{d_x(x, y)}$$

(Equations 1)

An edge image found in this way is divided into predetermined B small areas, and edge gradient histogram Fb is found for each small area. Elements of gradient histograms of each small area are taken as respective feature dimensions, and multidimensional feature vectors linking all these are taken as a feature amount and F. Edge gradient histogram Fb is shown by equations 2 below.

[2]

$$F = \{F_0, F_1, \ldots, F_{B-1}\}$$

$$F_b = \{f_0, f_1, \ldots, f_{D-1}\} \; b \in [0, B=1]$$

(Equations 2)

With an HOG, edge gradient values converted to 0 to 180 degrees are divided into nine directions and quantized, and a gradient histogram is calculated with an edge magnitude value as a weight. With a coHOG, edge gradient values of 0 to 360 degrees are divided into eight directions and quantized, and a histogram is calculated for each combination of gradient values of offset pixels of 30 surrounding points with each pixel within a local area as a reference point pixel. With a coHOG, an edge magnitude value is used for edge noise removal, and for pixels for which an edge magnitude value is greater than or equal to a threshold value, a number of events is counted for each gradient direction and for each gradient direction combination.

FIG. 2 is a drawing showing a conventional feature amount calculation method represented by Non-Patent Literature 1, Patent Literature 1, and Non-Patent Literature 3.

As shown in FIG. 2, feature amount calculation apparatus 10 is provided with feature value calculation section 12, histogram feature configuration section 13, discriminant function 14, and determination section 15.

When image data 11 (see FIG. 2a) is provided as input, feature value calculation section 12 first divides image data 11 into small areas (see FIG. 2b), and extracts edge data (see FIGS. 2c and 2d). FIG. 2 shows an example in which feature value calculation section 12 focuses attention on small area k of the thick-frame part in FIG. 2c, and calculates a small area k edge magnitude value and edge direction value. As edge data, an edge direction value (0 to 180 degrees or 0 to 360 degrees) is divided by Q, and values quantized into Q directions are used. A value of 8 or 9 is generally set for Q.

Next, histogram feature configuration section 13 counts pixels included in a local area as a histogram for each edge direction value. Histogram feature configuration section 13 links these edge direction value histograms for each local area to all local areas and creates a feature vector (see FIG. 2e). In FIG. 2, histogram feature configuration section 13 creates a feature vector in local area k of the thick-frame part in FIG. 2c.

Determination section 15 determines whether or not a feature vector for input image data created in this way is a target object, using discriminant function 14 created beforehand by means of offline learning processing, and outputs the result.

A window image used in human detection generally permits fluctuation according to a person's attitude, and includes not only a person area for using edge data with respect to a background but also a background area (see input image data 11 in FIG. 2, for example).

CITATION LIST

Patent Literature

PTL 1
Published Japanese Translation No. 2009-510542 of the PCT International Publication Non-Patent Literature NPL 1
N. Dalal and B. Triggs, "Histogram of Oriented Gradients for Human Detection", IEEE Computer Vision and Pattern Recognition, vol. 1, pp. 886-893, 2005
NPL 2
P. Viola, M. Jones, and D. Snow, "Detecting pedestrians using patterns of motion and appearance", IEEE International Conference on Computer Vision, 2003
NPL 3
T. Watanabe, S. Ito, and K. Yokoi, "Co-occurrence Histograms of Oriented Gradients for Pedestrian Detection", Pacific-Rim Symposium on Image and Video Technology, 2009

SUMMARY OF INVENTION

Technical Problem

However, the following problems remain to be solved in the conventional methods described in the cited literature.

(1) One problem is that, since edge information is extracted uniformly from within an image, when there are many edges in background pixels, noise is superimposed on a feature amount, and erroneous determination increases. That is to say, in all the conventional literature, noise is included in a feature vector since edge features generated within a window are handled uniformly and feature amounts are acquired uniformly.

Specifically, in the case of an HOG in Non-Patent Literature 1 and Patent Literature 2, edge directions are counted for all pixels within a cell, and therefore both an edge formed by background present in a cell and an edge formed by a person are counted uniformly in a histogram.

FIG. 3 is a drawing in which a feature image part of FIG. 2 is extracted, and background pixels are further added.

As shown in FIG. 3, a vertical silhouette line formed by a person's right shoulder (see FIG. 3f) and a horizontal line shown in the background (see FIG. 3g) are present in illustrated local area k.

However, with conventional technology, data of edge directions present in a local area is simply all uniformly counted in a feature vector, and therefore an originally unnecessary edge group arising from background data is counted in a histogram, and this becomes noise (see FIG. 3e). Consequently, a feature vector value is easily affected by the background edge situation, and in the case of a complicated image with many edges in the background, in particular, the determination accuracy of a discriminator falls significantly. Since background area image features vary infinitely according to the photographing environment, a more robust feature amount structure less susceptible to noise superimposition is necessary in an actual application in order to maintain performance in any environment.

The situation is also similar in the case of a coHOG described in Non-Patent Literature 3, and since, in the case of a coHOG, edge direction groups between neighboring pixels are counted, in addition to the above problem, for example, co-occurrences of an edge formed by a body-line of a person and an edge formed by the background are counted equally, and accuracy falls in a similar way due to the influence of noise.

Thus, with conventional technology, a feature amount extracts gradient information of an edge within an image uniformly from pixels within the image, the structure is one in which a feature vector tends to be affected by background pixels, and erroneous determination is prone to occur when there is a complicated background.

(2) Also, an edge feature comprises an edge magnitude and edge direction. With conventional technology, an edge magnitude value is only used as a threshold value for noise removal or as information for weighting edge direction reliability. That is to say, in a place where there is an edge, a feature amount is calculated using a combination of only that direction information uniformly. This problem is made clear by the images shown in FIG. 4.

FIG. 4 is a drawing showing image examples that give a visual representation of input color image data (FIG. 4a), black-and-white image data (FIG. 4b), edge magnitude value data (FIG. 4c), and edge direction data (FIG. 4d).

As in Non-Patent Literature 3, the edge magnitude value image shown in FIG. 4c is an image resulting from binarizing edge magnitude values using a certain threshold value, and white pixels are pixels for which the edge magnitude value is greater than or equal to the threshold value, while black pixels indicate pixels for which the edge magnitude value is less than or equal to the threshold value. The image representing edge direction data shown in FIG. 4d has been made visible by quantizing edge directions of 0 to 360 degrees into eight directions in 45-degree steps, and coloring the angles of the respective eight directions. Black shown in FIG. 4d indicates a pixel whose edge magnitude value is less than or equal to a threshold value, and whose edge direction value is consequently not used.

With conventional technology, among the images shown in FIG. 4, mainly only edge direction data has been used as a feature used in determining whether or not an object is a person.

Thus, with conventional technology, edge magnitude information has only been used for noise removal, and edge gradient information only has been utilized without regard to magnitude.

The present invention has been implemented taking into account the problems described above, and it is therefore an object of the present invention to provide a feature amount calculation apparatus, and feature amount calculation method and program, that enable an outline of an object such as a silhouette line of a person, and an important feature arising from object outline and surrounding image changes, to be extracted by reducing the influence of background noise.

Solution to Problem

A feature amount calculation apparatus of the present invention calculates a feature amount of a target object from image data, and is provided with: a feature value calculation section that calculates an edge direction and edge magnitude as input image data pixel-unit feature values; an edge direction group calculation section that combines the edge directions of a plurality of pixels and calculates an edge direction group as an inter-pixel feature amount; a correlation value calculation section that takes all pixels or a predetermined pixel of the plurality of pixels used in the feature value calculation as pixels subject to correlation value calculation, and calculates a correlation value of the edge magnitudes between the pixels subject to correlation value calculation for each feature amount; and a histogram creation section that counts the feature amounts in a histogram for each correlation value, and creates the histogram as a feature vector.

A feature amount calculation method of the present invention calculates a feature amount of a target object from image data, and has: a step of calculating an edge direction and edge magnitude as input image data pixel-unit feature values; a step of combining the edge directions of a plurality of pixels and calculating an edge direction group as an inter-pixel feature amount; a step of taking all pixels or a predetermined pixel of the plurality of pixels used in the feature value calculation as pixels subject to correlation value calculation, and calculating a correlation value of the edge magnitudes between the pixels subject to correlation value calculation for each feature amount; and a step of counting the feature amounts in a histogram for each correlation value, and creating the histogram as a feature vector.

From another viewpoint, the present invention is a program for causing a computer to execute the steps of the above-described feature amount calculation method.

Advantageous Effects of Invention

The present invention enables an outline of an object such as a silhouette line of a person, and an important feature arising from object outline and surrounding image changes, to be extracted by reducing the influence of background noise. In particular, the present invention is highly effective in suppressing erroneous determination in which a background image is determined to be a target object.

BRIEF DESCRIPTION OF DRAWINGS

FIG. 7 is a drawing representing an amplitude feature of edge magnitude given by a 3D object of a feature amount calculation apparatus according to above Embodiment 1;

FIG. 8 is a drawing that compares and explains above Embodiment 1 and a conventional method;

FIG. 9 is a drawing that compares and explains a feature vector of above Embodiment 1 and of a conventional method;

FIG. 13 is a flowchart showing processing by a feature amount calculation apparatus according to above Embodiment 1;

FIG. 19 is a drawing explaining an LBP feature of a feature amount calculation apparatus according to above Embodiment 2;

FIG. 22 is a drawing explaining representation of an inter-pixel edge direction group as $(\theta_{v1}, d\theta_{v2-v1})$ using a relative angle in feature amount calculation apparatuses according to the above embodiments.

DESCRIPTION OF EMBODIMENTS

Now, embodiments of the present invention will be described in detail with reference to the accompanying drawings.

Embodiment 1

First, terminology used in the embodiments will be explained. A "pixel value" includes a brightness value. "Edge magnitude" is information indicating a degree of change in a pixel value. Edge magnitude is expressed quantitatively by an "edge magnitude value" indicating a pixel value change amount. "Edge direction" indicates an edge gradient, and is a direction in which edge magnitude changes. An edge direction is expressed quantitatively by an "edge direction value" indicating a direction in which a degree of increase in a pixel value is greatest as an angle. An "edge direction group" is a group of edge directions for a plurality of positions in a previously defined specific arrangement relationship. An edge direction group is expressed as a group of edge direction values of each position. A "correlation value" is information quantitatively indicating a degree of edge magnitude correlation at the above plurality of positions, and is a value corresponding to an edge magnitude value change amount. "Edge gradient" has two meanings in this embodiment. The first meaning is edge gradient, as heretofore. The second meaning is an edge direction group and correlation value. "Connected edges" are a group of edges with edge magnitude connectivity. An "edge gradient group" is a collection of pixels with edge gradient (edge direction group and correlation value) connectivity. A "feature value" is information indicating a pixel-unit edge feature, and in this embodiment includes an edge magnitude value and edge direction value. A "feature amount" is information combining feature values, and in this embodiment includes an edge direction group. A "small area" is an image area forming a histogram creation unit, and is also referred to as a "local area" or "small block."

Figure 5:
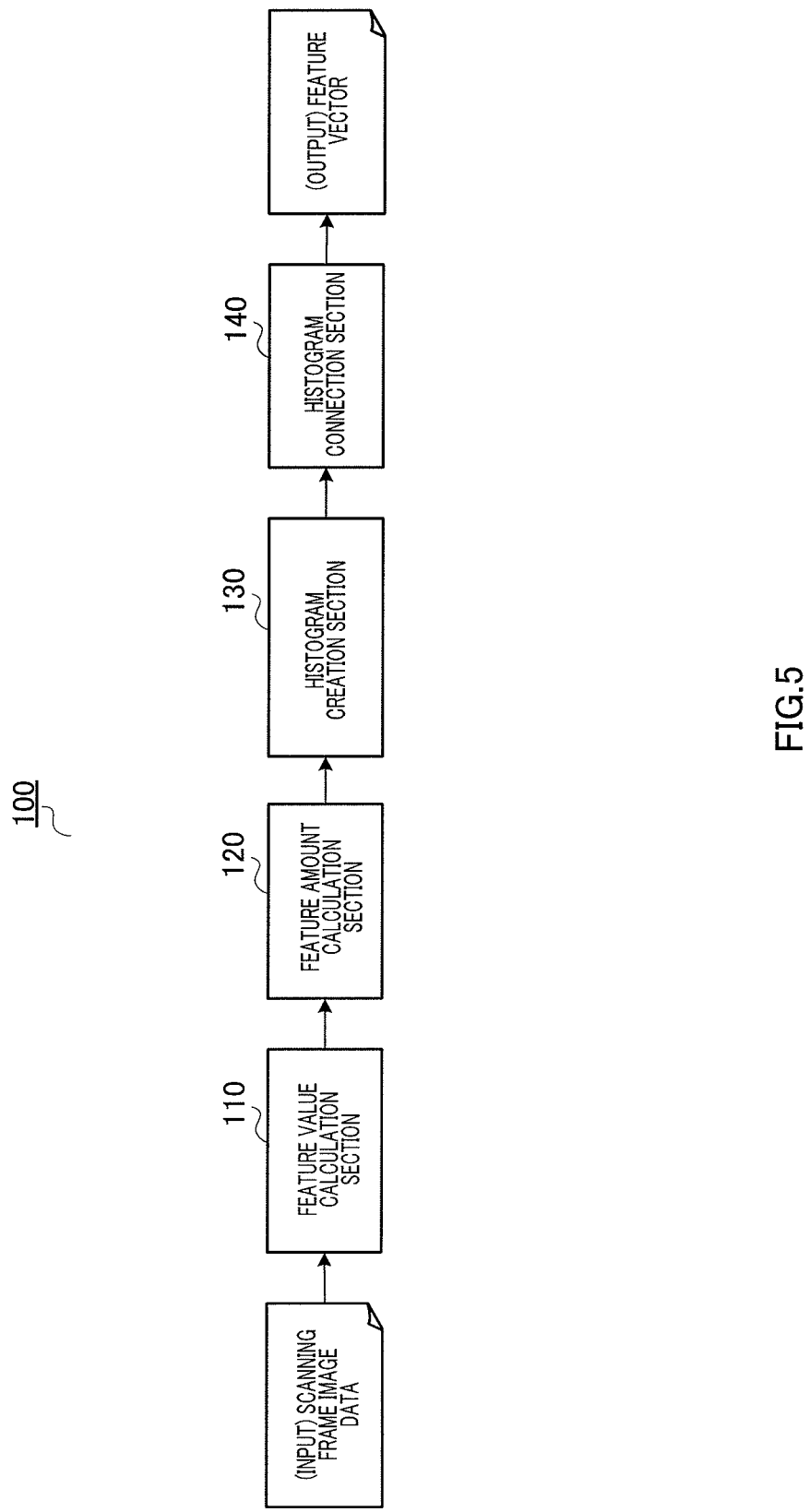
FIG. 5 is a block diagram showing the configuration of a feature amount calculation apparatus according to Embodiment 1 of the present invention.

FIG. 5 is a block diagram showing the configuration of a feature amount calculation apparatus according to Embodiment 1 of the present invention. A feature amount calculation apparatus of this embodiment is an example of application to an object detection apparatus that incorporates a feature amount calculation apparatus and is effective for object detection by means of image processing. In addition, a feature amount calculation apparatus of this embodiment can be applied to an object detector using the feature amount calculation method and an object detector learning method. Types of objects include faces, people, animals, and so forth, but in the following description, people will be considered as a particular example.

As shown in FIG. 5, feature amount calculation apparatus 100 is provided with feature value calculation section 110 that calculates an input image data pixel-unit feature value, feature amount calculation section 120 that combines the feature values of a plurality of pixels and calculates an inter-pixel feature amount, histogram creation section 130 that counts the feature values for each correlation value of pixels used in the feature value calculation, and creates the histogram as a feature vector, and histogram connection section 140 that connects feature vectors of all blocks.

Input to feature amount calculation apparatus 100 is a scanning frame image (image data). Output from feature amount calculation apparatus 100 is a feature vector used in discrimination. It is desirable for a scanning frame image to undergo brightness correction by a brightness correction section (not shown) before being input to feature value calculation section 110.

Feature value calculation section 110 calculates an edge direction and edge magnitude for each pixel from input image data. Here, feature value calculation section 110 calculates an edge magnitude and edge direction for all pixels of an input image. Feature value calculation section 110 may also be referred to as an edge extraction section.

When input image data is provided, feature value calculation section 110 finds an edge direction for each pixel of the image data. For example, if a pixel at coordinates (x, y) is denoted by I (x, y), edge direction θ can be found by means of equations 3 and 4 below. Equations 3 are the same as equations 1 given earlier.

[3]

$$d_x(x,y)=I(x+1,y)-I(x-1,y)$$

$$d_y(x,y)=I(x,y+1)-I(x,y-1) \quad \text{(Equations 3)}$$

$$\theta(x, y) = \tan^{-1}\frac{d_y(x, y)}{d_x(x, y)} \quad \text{(Equation 4)}$$

When equations 3 and 4 are used, θ is found as a number of degrees between 0 and 360. Here, the number of degrees may be divided by Q, and values quantized into Q directions may be used.

With regard to feature values of each pixel, a group of values of above edge direction θ of a plurality of pixels in arrangement relationships in previously defined N specific space-times are taken as feature values. An above space-time means a three-dimensional space comprising two-dimensional space (x, y) in an image and time domain t, and is decided uniquely by intra-image position (x, y) and time-domain value (t). An arrangement relationship in space-time can be defined by means of distances ($dd_x$, $dd_y$, $dd_t$) or the like, such as nearby pixels within three-dimensional space-time with respect to a certain target pixel (x, y, t) in an image.

In feature value calculation, it is the same even if points of two or more pixels in space-time are used. Here, a description is given by way of example of a case in which two points are used.

Above, edge direction group ($\theta_{v1}$, $\theta_{v2}$) is calculated for each of pixels v1 and v2 in a previously defined specific arrangement relationship.

Figure 6:
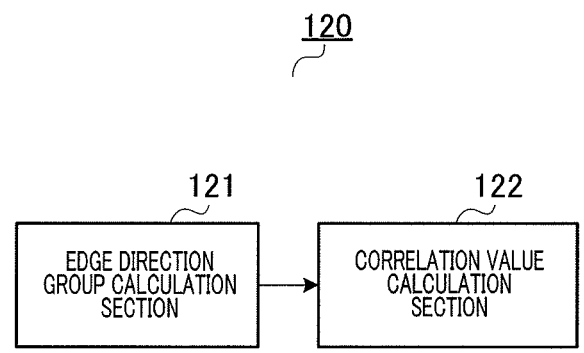
FIG. 6 is a block diagram showing the configuration of a feature amount calculation section of a feature amount calculation apparatus according to above Embodiment 1.

FIG. 6 is a block diagram showing the configuration of feature amount calculation section 120.

As shown in FIG. 6, feature amount calculation section 120 is provided with edge direction group calculation section 121 that calculates a group of edge directions, and correlation value calculation section 122 that takes all pixels or a predetermined pixel among the plurality of pixels as pixels subject to correlation value calculation and calculates a correlation value between the pixels subject to correlation value calculation.

Feature amount calculation section 120 performs the processing in FIG. 13A described later herein in block units.

Edge direction group calculation section 121 and correlation value calculation section 122 perform the processing in FIG. 13B described later herein on pixel v1 within a block for N corresponding pixels v2.

Correlation value calculation section 122 operates closely coupled with edge direction group calculation section 121.

Correlation value calculation section 122 calculates edge magnitude values $m_{v1}$ and $m_{v2}$ for each pixel by means of equation 5 below, for example, from pixel values for pixels v1 and v2 used by the above-described feature value calculation section when calculating feature values ($\theta_{v1}$, $\theta_{v2}$).

[4]

$$m_v = \sqrt{d_x(x,y)^2 + d_y(x,y)^2} \quad \text{(Equation 5)}$$

Feature amount calculation section 120 calculates correlation value $C_{v1,v2}$ by means of equation 6 below, based on an edge magnitude value.

[5]

$$C_{v1,v2} = G(m_{v1} - m_{v2}) \quad \text{(Equation 6)}$$

Above G(x) is a function for multiplying a gradient by the size of an edge magnitude difference value, and G(x)=x may be used, or G(x) may be calculated by means of equation 7 below, using threshold value $\alpha$.

[6]

$$G(x) = k, \text{ if } \alpha_k \leq x < \alpha_{k+1} \; k \in [0,1,2, \ldots T-1] \quad \text{(Equation 7)}$$

The form of the G(x) equation is not restricted, but here it is assumed that T-stage correlation values having values of 0 to T−1 are output as C.

Returning to FIG. 5, histogram creation section 130 performs the processing in FIG. 13A described later herein in block units.

To histogram creation section 130 ($\theta_{v1}$, $\theta_{v2}$, $C_{v1,v2}$) comprising edge direction information and a corresponding correlation value is input in a quantity (N) equivalent to a predetermined number of feature values as output of correlation value calculation section 122 of feature amount calculation section 120.

Here, $\theta_{v1}$ and $\theta_{v2}$ can have Q values from 0 to Q−1 based on respective edge direction quantization value Q. $C_{v1,v2}$ assumes T values from 0 to T−1. Thus, a histogram is prepared in which ($\theta_{v1}$, $\theta_{v2}$, $C_{v1,v2}$) value group Q*Q*T elements are assigned to each bin of the histogram.

The number of pixels having a ($\theta_{v1}$, $\theta_{v2}$, $C_{v1,v2}$) feature value is counted in a histogram from pixels present in a local area of input image data, and a Q*Q*T-dimensional feature vector with a value of each bin as one feature vector dimension is generated.

Histogram connection section 140 connects feature vectors of all blocks.

Thus, feature value calculation section 110 of feature amount calculation apparatus 100 divides input image data into previously specified small blocks, and calculates an edge magnitude value (a real number between 0.0 and 1.0) and an edge direction value as feature values for each small area. Feature amount calculation section 120 calculates inter-pixel edge direction values and correlation value ($\theta_{v1}$, $\theta_{v2}$, $C_{v1,v2}$) for N predetermined pixels. Histogram creation section 130 counts feature values in a histogram that sets a bin for each feature value ($\theta_{v1}$, $\theta_{v2}$, $C_{v1,v2}$), and performs calculation for each small area. Histogram connection section 140 connects these and outputs them as a feature vector.

Figure 1:
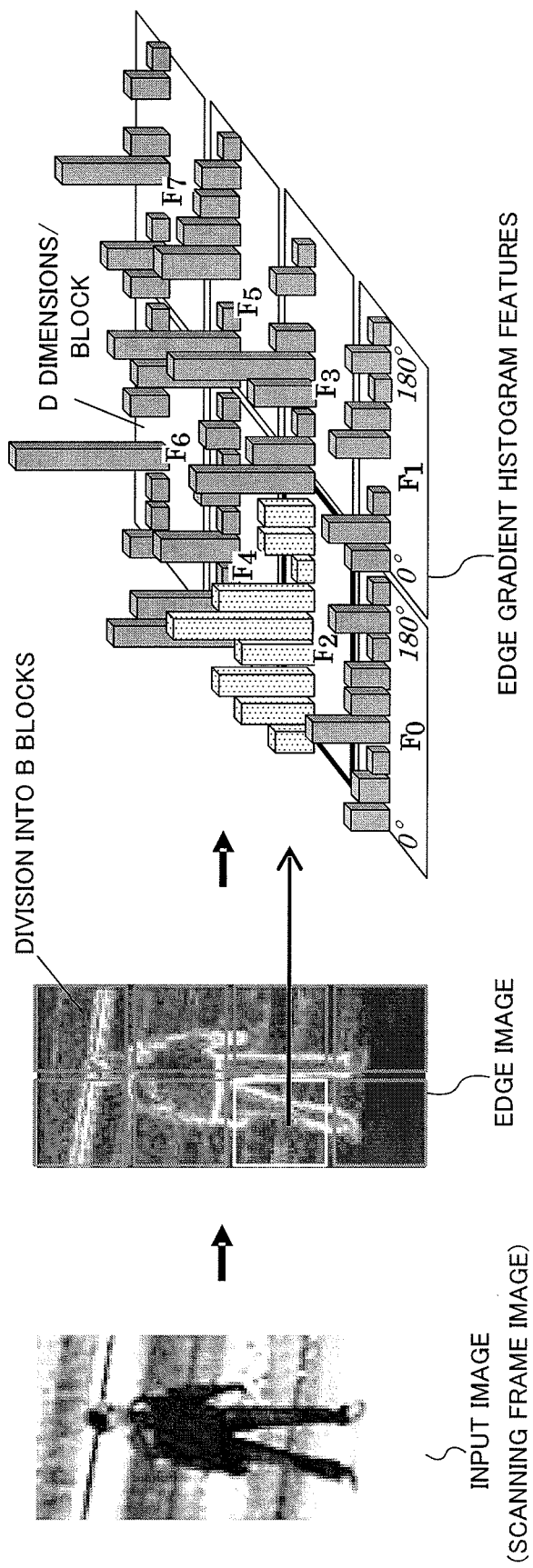
FIG. 1 is a drawing explaining an HOG feature amount and coHOG feature amount.
Figure 2:
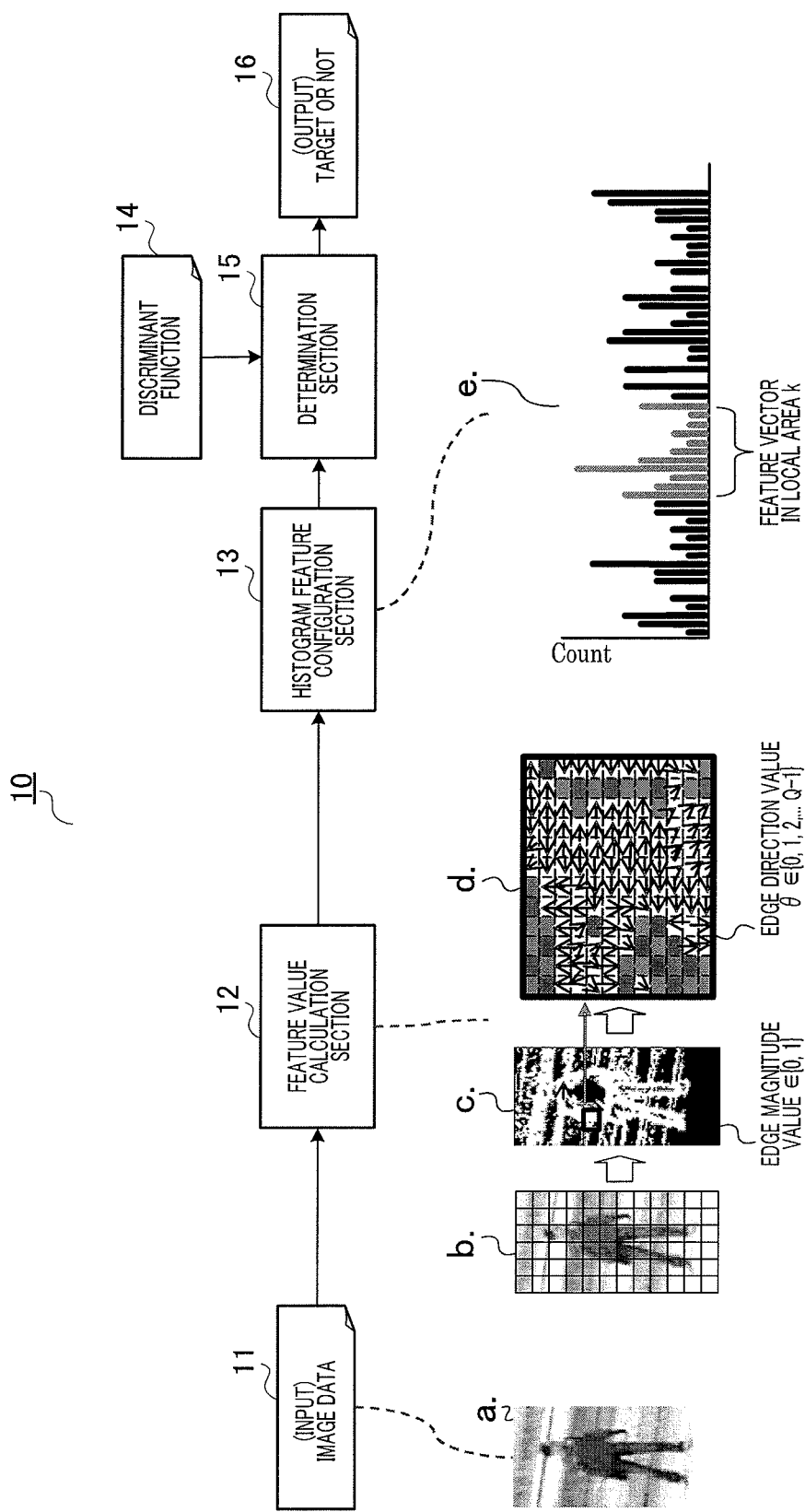
FIG. 2 is a drawing showing a conventional feature amount calculation method.
Figure 3:
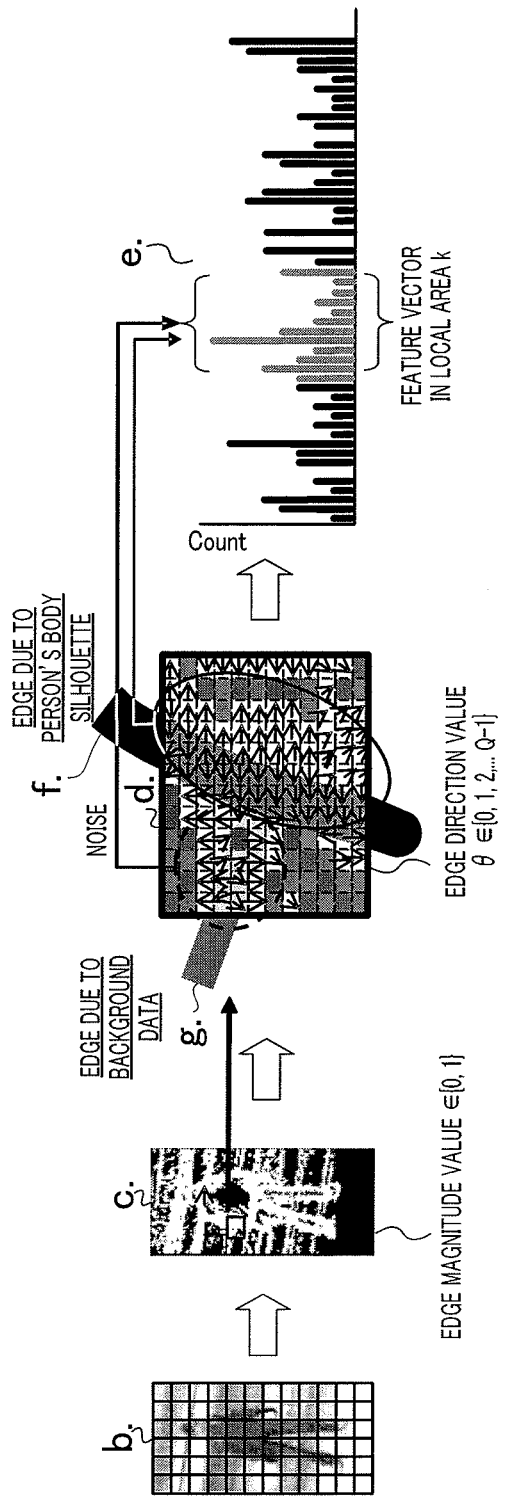
FIG. 3 is a drawing in which a feature image part of FIG. 2 is extracted, and background pixels are further added.
Figure 4:
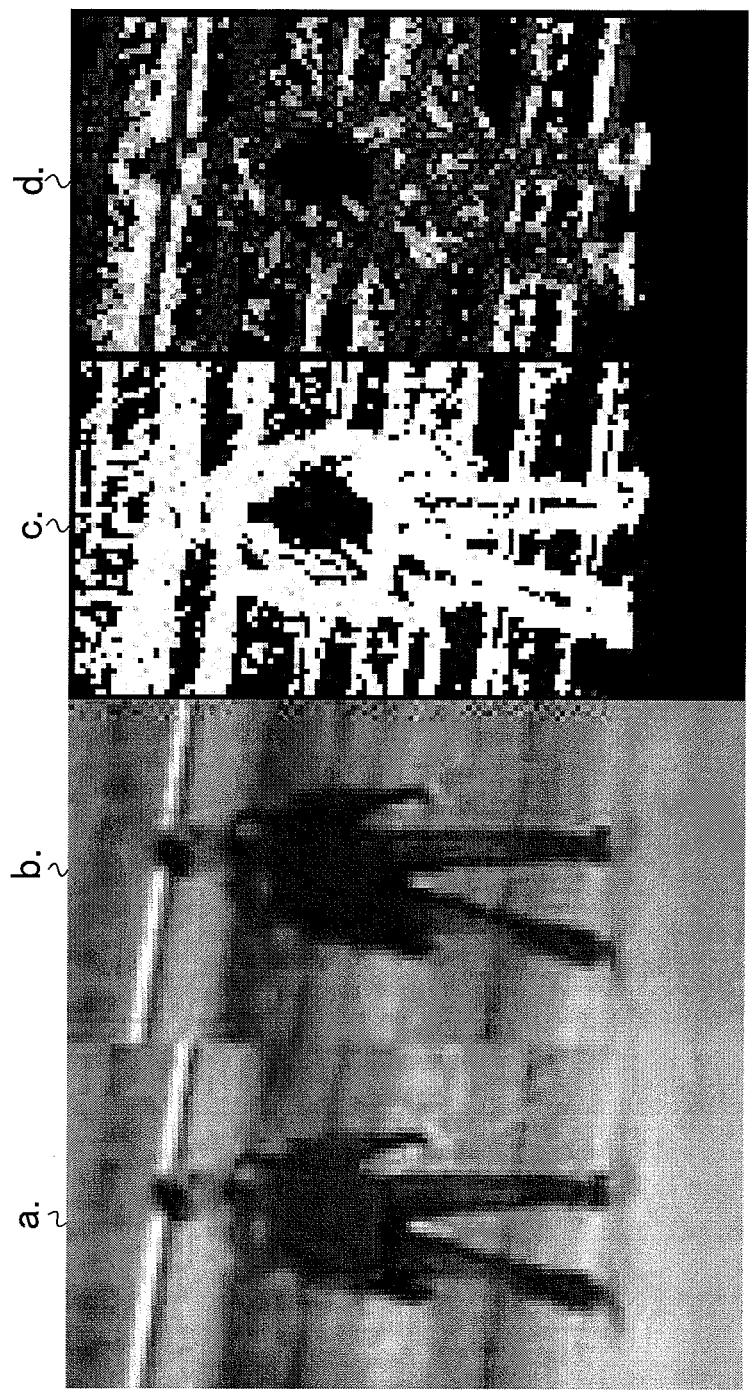
FIG. 4 is a drawing showing image examples that give a visual representation of input color image data, black-and-white image data, edge magnitude value data, and edge direction data.

An object detection apparatus can be implemented by combining above feature amount calculation apparatus 100 with discriminant function 14 and determination section 15 in FIG. 2 referred to earlier. Discriminant function 14 is closely related to determination section 15, and determination processing is performed by determination section 15 using discriminant function 14 information learned beforehand by means of a generally known SVM (Support Vector Machine), boosting, random forest, or suchlike learning algorithm.

This determination section uses a discriminant function constructed beforehand by means of offline learning processing, determines whether or not an input feature vector is a target, and here outputs whether or not the object is a person.

That is to say, feature amount calculation apparatus 100 finds an edge magnitude correlation value, and creates a histogram by counting an edge direction group for each edge magnitude correlation value. By this means, feature amount calculation apparatus 100 can acquire a feature amount (histogram) indicating not only edge gradient correlation (connectivity) but also edge magnitude correlation (connectivity). That is to say, feature amount calculation apparatus 100 can extract an edge gradient group that characteristically appears in an object outline such as a person's silhouette from an image. Therefore, feature amount calculation apparatus 100 can reduce the influence of background noise and calculate a feature amount of an outline of an object such as a person.

The operation of feature amount calculation apparatus 100 configured as described above will now be explained.

First, the basic concept of the present invention will be explained.

In a feature amount calculation method of the present invention, when a feature vector is constructed by creating a histogram of feature values calculated using information of a plurality of pixels, a function is provided that determines correlation (including similarity) between pixels used in feature amount calculation, and a feature value histogram is constructed for each inter-pixel correlation value.

More specifically, information such as an edge magnitude value and input image pixel value is used to determine whether or not inter-pixel correlation is high, and an inter-pixel edge direction histogram feature having a series of edges represented by a silhouette line showing an object shape is extracted. In particular, an edge magnitude value is not binarized for noise removal as in conventional technology, but a real number is used.

With the present invention, when attention is focused on a small area, since there is little change in either a collection of detection target object pixels or a collection of adjacent background area pixels, with a pixel group forming a series of edges appearing at a boundary, attention is focused on the possibility of a pixel value and edge magnitude value having close values. The fact that an actual pixel value varies according to an object but inter-pixel correlation is similar between neighboring pixels of the same object is utilized. A silhouette line of an object line can be captured accurately by utilizing this feature. "Accurately" means capturing only a feature formed by an edge from the same object, and making it easier to capture a series of edges.

In addition, not only inter-pixel information with high correlation, but also feature values for each correlation value, are handled.

FIG. 7 is a drawing representing an amplitude feature of edge magnitude given by a 3D object.

With an edge formed by a background and an edge formed by a 3D object, there appears in a silhouette line of a person or leg in person image, for example, an amplitude of an edge magnitude value given by a 3D form such as illustrated in FIG. 7A around a strong edge occurring at a boundary with the background. In the present invention, this feature is utilized, and what kind of feature value gradient there is between pixels in what degree of correlation of the edge contour can be captured in detail utilizing inter-pixel edge magnitude and suchlike correlation information.

As shown in FIG. 7A, edge magnitude information is also an important feature that often represents a person's silhouette.

Focusing attention on an edge magnitude image, there is a feature specific to a person image. An edge magnitude value has a predetermined maximum value at a boundary between a background area and a person area, and there is a hill-shaped amplitude shape in a direction perpendicular to a silhouette line (see FIG. 7A). The amplitude height varies according to person image and background image color information. As shown in FIG. 7B, hill-shaped amplitude occurs serially along a person's silhouette line, and appears as an edge magnitude contour line with a boundary part as a ridge.

Utilizing this feature, an edge gradient between pixels on a contour line for which edge magnitudes have similar values is extracted. By this means, pixel connectivity is captured, and a person's silhouette can be extracted stably.

In addition, an inter-pixel edge feature (edge gradient) that straddles an edge magnitude contour line is extracted. Since a person has a three-dimensional shape, a feature (edge gradient group) appearing with edges for which a brightness value changes smoothly given the roundness of a person forming a group on the inner side (person area side) of a strong edge occurring at a boundary between a person and background is extracted.

That is to say, since an image area that includes many edge gradient groups has a high possibility of including an object outline, the present invention enables an object to be extracted stably.

A feature amount that takes the above into consideration is shown in equation form below. As stated above, for a feature amount of the present invention, two or more pixels are used to determine edge connectivity using edge magnitude correlation, and that inter-pixel correlation and inter-pixel edge information (edge gradient) are extracted. For simplicity, equations 8 below are for a case in which an edge gradient group and edge magnitude correlation between two pixels are used.

[7]

$$F = \{F_0, F_1, \ldots, F_{B-1}\}$$
$$F_b = \{f_0, f_1, \ldots, f_{D-1}\}$$
$$f_d = f_{(\theta, d\theta, s)}$$
$$= \sum_i \sum_j \begin{cases} 1 & \text{if } s = \Gamma(|mag(x_j, y_j) - mag(x_i, y_i)|) \\ & \& \ \theta = Q(\theta(x_i, y_i)) \\ & \& \ d\theta = Q'(\theta(x_j, y_j) - \theta(x_i, y_i)) \\ 0 & \text{else} \end{cases}$$

(Equations 8)

In above equations 8, it is assumed that b∈[0, B−1] and d∈[0, D−1]. Feature vector F comprises B blocks, and connects D-dimensional edge gradient histogram features in each block. Also, Q( ) and r( ) indicate quantization functions, and number of dimensions D is decided based on an edge gradient direction quantization number and edge magnitude quantization number. Q and Q' in equations 8 may be the same or different.

In each block, correlation between intra-block pixel (xi, yi) and neighboring pixel (xj, yj) is calculated based on an edge magnitude difference, and edge gradient value θ and relative angle dθ are counted in histogram features as a pair.

A comparative description of this embodiment and a conventional method will now be given.

FIG. 8 is a drawing that compares and explains this embodiment and a conventional method. FIG. 8A is an input image, FIG. 8B and FIG. 8C are images on which edge extraction has been performed in accordance with above equations 3 through 5, FIG. 8B being an edge magnitude image, and FIG. 8C an edge direction image. The edge direction image in FIG. 8C has edge directions 0 to 360° quantized into eight directions and colored.

With a conventional method, only the edge direction image in FIG. 8C is mainly used. To be precise, with an HOG, when creating an edge direction histogram, an edge magnitude value is used as an edge direction value reliability value. However, this is not used in an application in which edge connectivity and inter-pixel similarity are captured from edge magnitude image information, as in this embodiment. Also, with a coHOG, to be precise, an edge magnitude value is subjected to threshold value processing and binarized before use.

In contrast, in this embodiment, both the edge magnitude image in FIG. 8B and the edge gradient image in FIG. 8C are used.

A comparative description will now be given of a feature vector of this embodiment and of a conventional method.

FIG. 9 is a drawing that compares and explains a feature vector of this embodiment and of a conventional method. FIG. 9A is an input image, FIG. 9B is an edge image of this embodiment, and FIG. 9C is a feature vector of this embodiment. Also, FIG. 9D is an edge image of a conventional method, and FIG. 9E is a feature vector a conventional method.

As shown in FIG. 9B and FIG. 9D, an edge image is calculated in both this embodiment and a conventional method. In the case of FIG. 9B and FIG. 9D, there is a. person area pixel edge and b. background area pixel edge (noise).

As shown in FIG. 9E, for a feature amount of a conventional method, edge directions of all pixels within an area are counted uniformly. Consequently, edge noise due to a background is superimposed on an edge feature given by a person.

In contrast, as shown in FIG. 9C, in this embodiment edge gradient information (an edge gradient) is extracted taking edge magnitude similarity into account. Consequently, as shown in FIG. 9A, noise is not superimposed on an important feature that captures a person's silhouette line or the like, and a value of a feature that is important for discrimination can be extracted stably.

That is to say, whereas noise is superimposed in a conventional method (see FIG. 9E-c), in this embodiment there is a feature that separates noise (see FIG. 9C-d).

Figure 10:
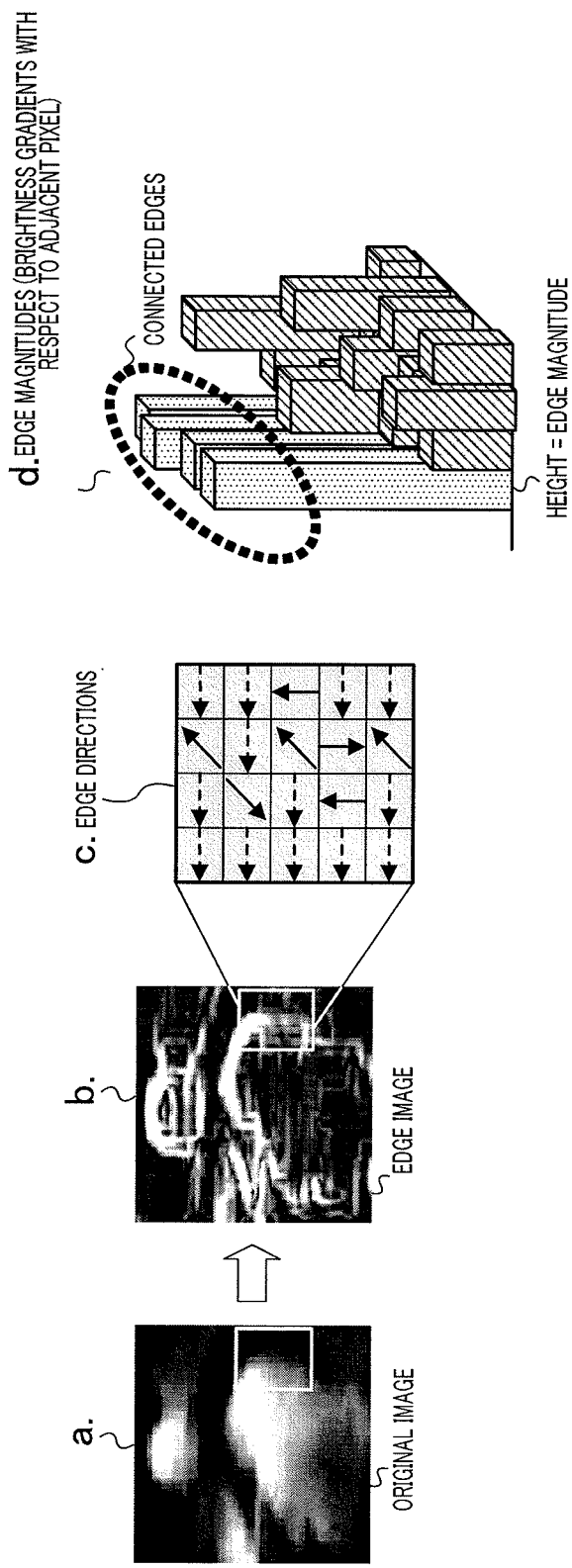
FIG. 10 is a drawing explaining edge connectivity and connected edges of above Embodiment 1.

FIG. 10 is a drawing explaining edge connectivity and connected edges of this embodiment.

Feature value calculation section 110 (see FIG. 5) calculates edge magnitude and edge direction for all pixels of an input image. Feature value calculation section 110 calculates the edge image (edge gradient image) in FIG. 10b for the original image in FIG. 10a, using real numbers. Feature value calculation section 110 calculates the edge directions in FIG. 10c and the edge magnitudes in FIG. 10d. In the case of the edge image (edge gradient image) in FIG. 10b, the solid-line arrows in FIG. 10c indicate person area pixel edge directions, and the dotted-line arrows in FIG. 10c indicate background area pixel edge (noise) directions.

An edge magnitude in FIG. 10d is a brightness gradient with respect to an adjacent pixel. A histogram height in FIG. 10d indicates edge magnitude. In the case of the edge image (edge gradient image) in FIG. 10b, a solid-line histogram in FIG. 10d indicates person area pixel edge magnitude, and a hatched histogram in FIG. 10d indicates background area pixel edge (noise) magnitude. In this embodiment, a feature is extraction of gradient information (edge gradients) of connected edges taking account of edge magnitude similarity. In the case of the edge image (edge gradient image) in FIG. 10b, edge magnitudes enclosed by a dotted line in FIG. 10d represent edge magnitude similarity, and indicate edge (edge gradient) connectivity. These edges are referred to as connected edges. To explain in more detail, with connected edges there is clearly lower inter-pixel correlation than in the case of a hatched histogram in FIG. 10d, and there is connectivity among connected edges whereby edges (edge gradients) are connected. In this way, a series of edges are captured by utilizing edge magnitude information, and an edge gradient histogram is constructed according to inter-pixel connectivity.

The operation of feature amount calculation apparatus 100 will now be described.

Figure 11:
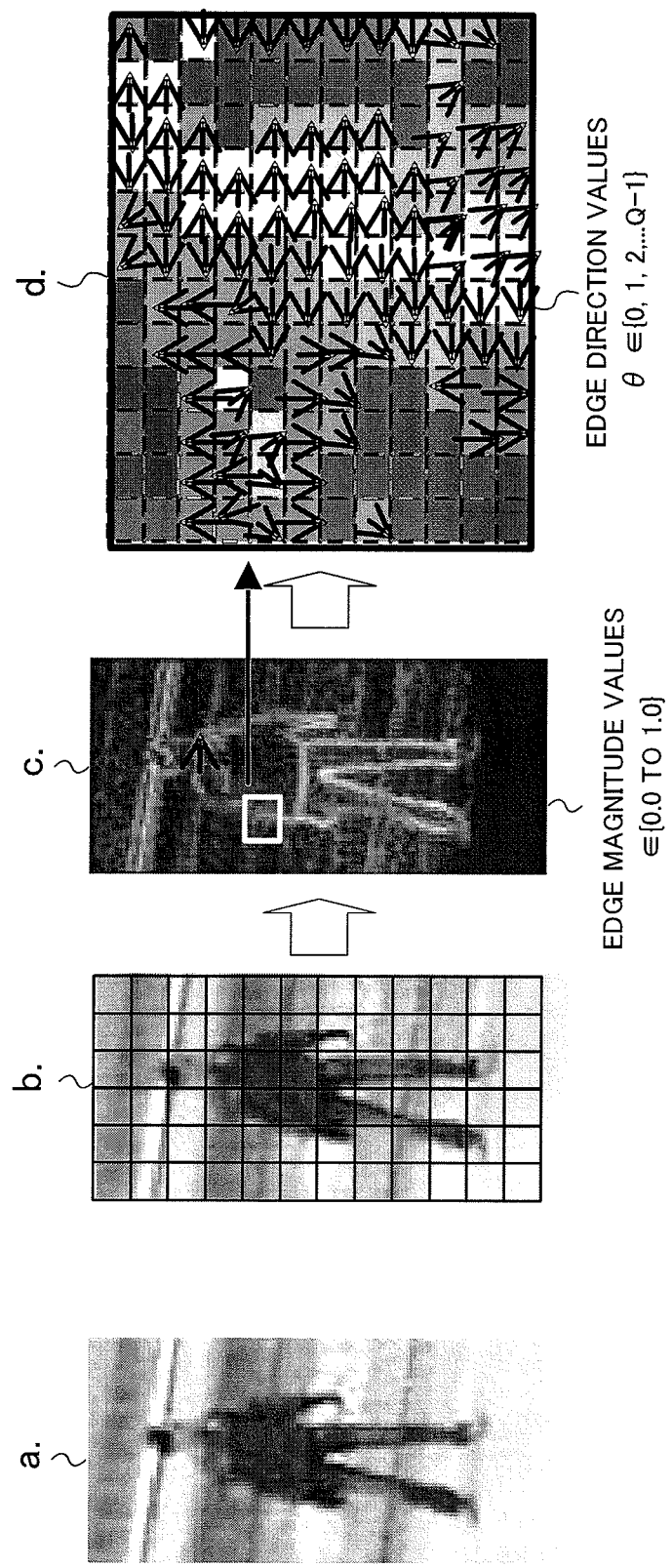
FIG. 11 is a drawing explaining the operation of a feature amount calculation apparatus according to above Embodiment 1.
Figure 12:
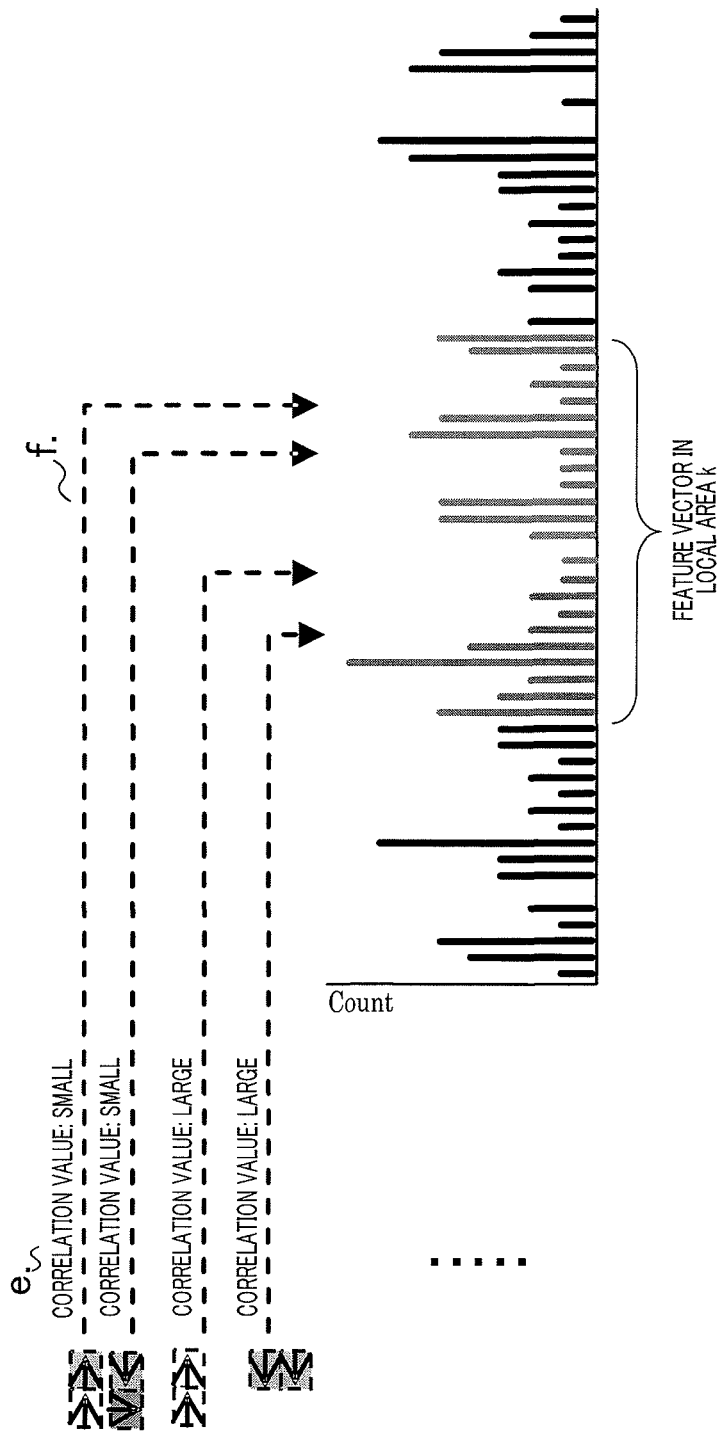
FIG. 12 is a drawing explaining the operation of a feature amount calculation apparatus according to above Embodiment 1.

FIG. 11 and FIG. 12 are drawings explaining the operation of feature amount calculation apparatus 100.

FIG. 11a is image data input to feature value calculation section 110 of feature amount calculation apparatus 100 (see FIG. 5). FIGS. 11b through 11d are feature value calculation section 110 processing images, FIG. 11b being an edge image (edge gradient image), FIG. 11c edge magnitude value $\epsilon \{0.0$ to $1.0\}$, and FIG. 11d edge direction value (edge gradient) $\epsilon \{0, 1, 2, \ldots, Q-1\}$. As stated above, edge magnitude values are not binarized for noise removal as heretofore, but real numbers $\{0.0$ to $1.0\}$ are used.

FIG. 12e is a correlation value calculated by feature value calculation section 110, and FIG. 12f is a feature vector counted by histogram creation section 130.

In feature value calculation section 110, input image data is divided into blocks. The unit of division is called a small block (small area).

Feature value calculation section 110 calculates an edge magnitude and edge direction (edge gradient) for the entirety (all pixels) of input image data.

Feature amount calculation section 120 combines feature values of a plurality of pixels of input image data and calculates an inter-pixel feature amount. To be more precise, feature amount calculation section 120 takes all pixels or a predetermined pixel of the plurality of pixels as pixels subject to correlation value calculation, and calculates a correlation value between the pixels subject to correlation value calculation.

Histogram creation section 130 performs division into the above small blocks (where a plurality of pixels are included in a small block), and creates a histogram for each divided small block.

Here, a series of edges are captured using edge magnitude values of local area k in FIG. 11c and edge direction values (edge gradients) (see FIG. 11d), and an edge gradient histogram is constructed according to inter-pixel connectivity. That is to say, a feature amount structure is achieved that simplifies extraction of edge features given by the same object by calculating inter-pixel similarity from edge magnitude values, and capturing co-occurrence between pixels (edge gradient groups) having connectivity.

A range indicated by a feature vector in local area k in FIG. 12f means a histogram of a k'th small block.

Histograms are created on a per small block basis, for all small blocks, histograms are integrated, and a histogram drawing is finally created (see FIG. 12f). The count to the immediate left of the range indicated by a feature vector in local area k is "k−1'th" for example, and the count to the immediate right is "k+1'th" for example.

When creating histograms for each small block, the first pixel (calculation-start pixel=pixel of interest) of a coHOG (method using two pixels) is each pixel included in the relevant small block. As the second pixel (nearby edge), a pixel outside a small block is also applicable.

FIG. 13 is a flowchart showing processing by feature amount calculation apparatus 100.

As shown in FIG. 13A, when scan image data is input, in step S1 feature value calculation section 110 calculates $d_x$ and $d_y$ for each pixel in accordance with above equations 3.

In step S2, feature value calculation section 110 calculates edge direction $\theta$ and edge magnitude m for each pixel in accordance with above equations 4 and 5.

In step S3, feature amount calculation section 120 performs processing for each small block. At this time, feature amount calculation section 120 also performs division into small blocks.

In step S4, histogram connection section 140 connects feature vectors of all blocks, outputs a scan image data feature vector, and terminates this processing flow.

FIG. 13B is a flowchart showing in detail the processing for each small block in above step S3. Feature amount calculation section 120 repeats performing processing for each pixel v1 in a block. First, in step S11, edge direction group calculation section 121 and correlation value calculation section 122 of feature amount calculation section 120 calculate an edge direction group and correlation value for pixel v1 and pixel v2 for which N specific space-times are in a positional relationship in accordance with above equations 6 and 7.

In step S12, histogram creation section 130 counts a calculated edge direction group and correlation value (edge gradient) in a histogram, and returns to above step S11. In this way, feature amount calculation section 120 is repeatedly involved in processing for each pixel in a block within the dotted-line frame in FIG. 13B.

FIG. 14 is a drawing showing an actual example of edge magnitude values and a correlation value.

Figures 14A, 14B:
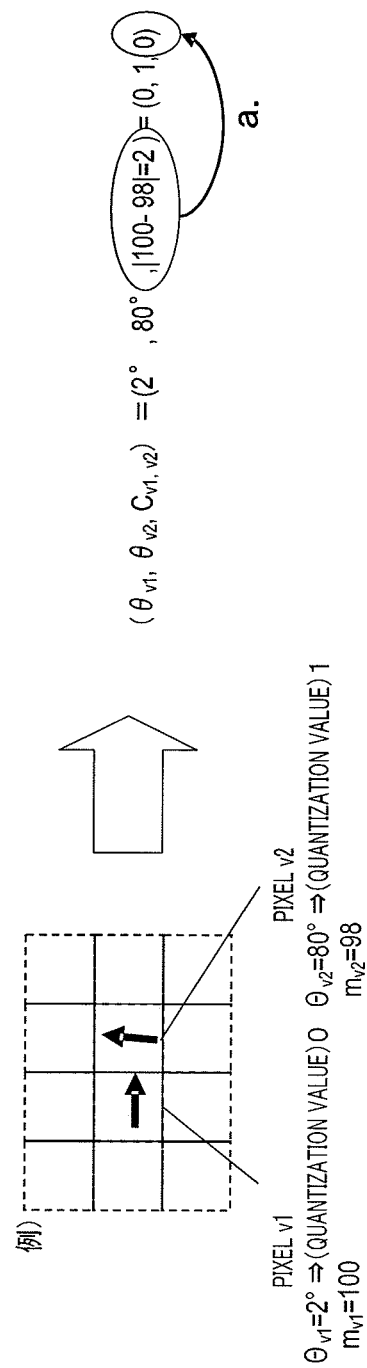
FIG. 14 is a drawing showing an actual example of edge magnitude values and a correlation value according to above Embodiment 1.

As shown in FIG. 14A, when feature value calculation section 110 calculates edge directions $\theta_{v1}$ and $\theta_{v2}$ and edge magnitude values $m_{v1}$ and $m_{v2}$ for pixel v1 and pixel v2, feature amount calculation section 120 sets a value of correlation value C based on a magnitude value difference value in accordance with above equation 6. As shown in FIG. 14B, inter-pixel edge direction values and correlation value ($\theta_{v1}$, $\theta_{v2}$, $C_{v1,v2}$) are set. Also, as shown in FIG. 14Ba, quantization is performed by providing a threshold value for the above difference value. As an example, 0 is set if a difference value is less than or equal to a previously specified threshold value (for example, a threshold value of 5), and 1 is set if a difference value is greater than or equal to that threshold value.

[Implementation Example]

In this embodiment, the way in which a histogram dimension is defined is arbitrary. Therefore, application and adaptation to various feature values are possible taking two or more pixels into consideration as with a conventional method coHOG or LBP. For comparison, Non-Patent Literature 1 (Dalal's HOG) and a conventional method coHOG are compared, and the efficacy of this embodiment is verified.

Figure 15:
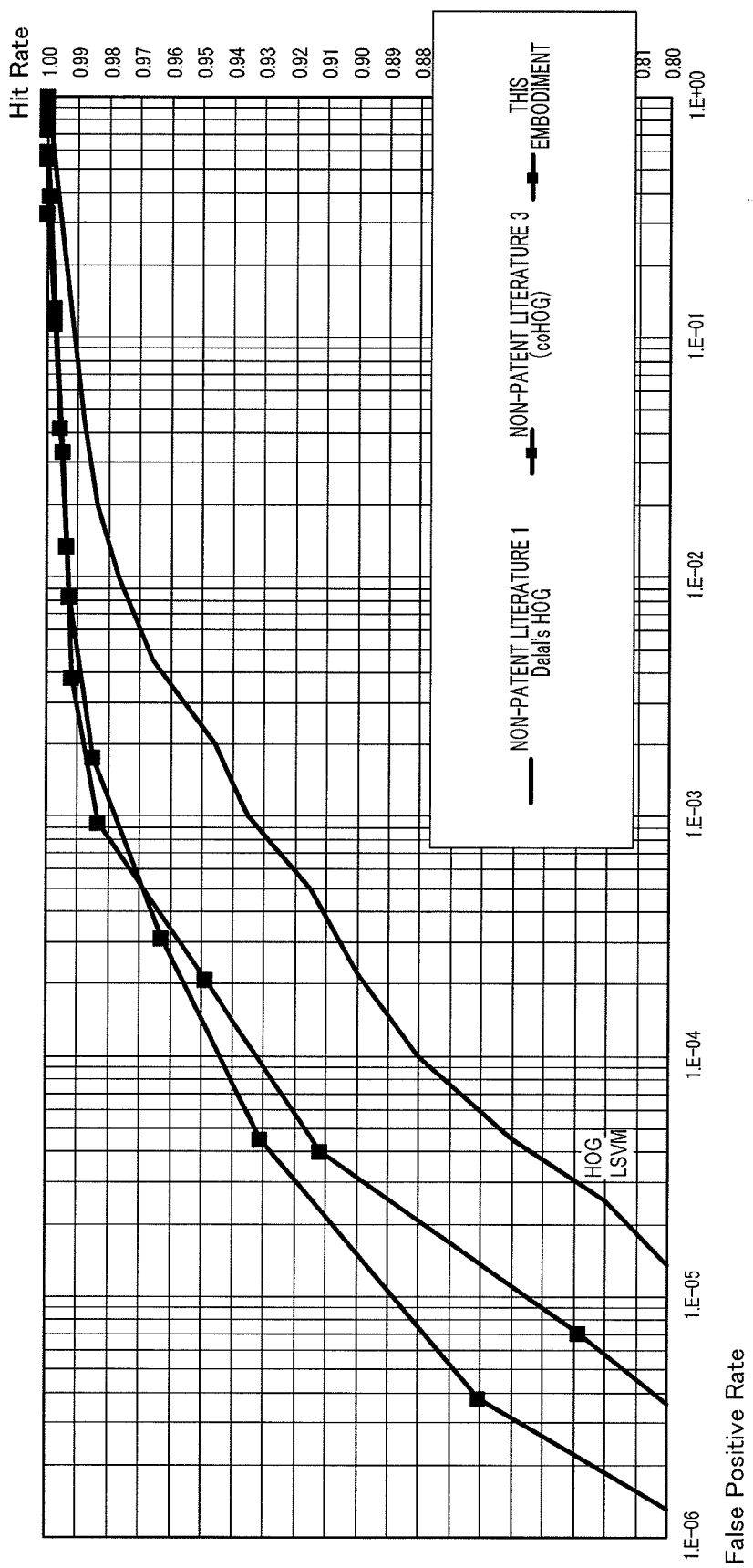
FIG. 15 is a drawing showing in chart form results of performing accuracy efficacy verification using a feature amount calculation apparatus of above Embodiment 1.

FIG. 15 is a drawing showing in chart form results of performing accuracy efficacy verification using feature amount calculation apparatus 100 of this embodiment.

An INRIA data set often used in human detection algorithm evaluation, proposed in Non-Patent Literature 1, was used as a database used in the experiment. Also, 2,416 person images and 1,218 background images not showing persons, were prepared as learning images. Rectangular images of ten places randomly clipped from the prepared 1,218 background images are used as background samples in accordance with information from INIRA website: http://pascal.inrialpes.fr/data/human/

Chart 1 in FIG. 15 is an ROC (receiver operating characteristic) curve, and indicates a false positive rate on the horizontal axis and a hit rate on the vertical axis. It is desirable for a hit rate value to be high for a low false positive rate setting, and positioning at the upper-left in the graph means that performance is higher.

In this ROC curve, as a result of comparison with a coHOG method using similar learning data and detection data, in the case of false positive rates 1e-4 and 1e-5, a 2 to 4% improvement in performance has been confirmed, and efficacy has been confirmed.

Here, in this embodiment, a calculation equation has been given that finds a correlation value based on an edge magnitude difference between a plurality of pixels in correlation value calculation, but in addition to an edge magnitude difference, calculation may also be performed using a pixel value difference and space-time distance, as in equation 9 below.

[8]

$$C_{v1,v2} = \alpha * G_1(m_{v1}-m_{v2}) + \beta * G_2(I_{v1}-I_{v2})\gamma * G_3(\text{dist}(v_1,v_2)) \quad \text{(Equations 9)}$$

In above equation 9, α, β, and β indicate real numbers between 0.0 and 1.0 and are constants representing weights of each term. Also, represents a pixel value for pixel v. Furthermore, dist( ) indicates a function that returns an inter-pixel distance value, and may be found by means of a Euclidian distance or the like. Each G may be a method given in above equation 7.

If input is a color image, edge directions and edge magnitudes may be calculated by means of equations 10 through 13 below, using values of three elements of input color data.

[9]

$$d_{Rx}(x,y) = I_R(x+1,y) - I_R(x-1,y)$$

$$d_{Ry}(x,y) = I_R(x,y+1) - I_R(x,y-1)$$

$$d_{Gx}(x,y) = I_G(x+1,y) - I_G(x-1,y)$$

$$d_{Gy}(x,y) = I_G(x,y+1) - I_G(x,y-1)$$

$$d_{Bx}(x,y) = I_B(x+1,y) - I_B(x-1,y)$$

$$d_{By}(x,y) = I_B(x,y+1) - I_B(x,y-1) \quad \text{(Equations 10)}$$

$$m_{Rv} = \sqrt{d_{Rx}(x,y)^2 + d_{Ry}(x,y)^2}$$

$$m_{Gv} = \sqrt{d_{Gx}(x,y)^2 + d_{Gy}(x,y)^2}$$

$$m_{Bv} = \sqrt{d_{Bx}(x,y)^2 + d_{By}(x,y)^2} \quad \text{(Equations 11)}$$

$$m_v = m_{Rv}, \text{MaxColId} = R, \text{ if } m_{Rv} = \max(m_{Rv}, m_{Gv}, m_{Bv})$$

$$m_v = m_{Gv}, \text{MaxColId} = G, \text{ if } m_{Gv} = \max(m_{Rv}, m_{Gv}, m_{Bv})$$

$$m_v = m_{Bv}, \text{MaxColId} = B, \text{ if } m_{Bv} = \max(m_{Rv}, m_{Gv}, m_{Bv}) \quad \text{(Equations 12)}$$

$$\theta(x, y) = \tan^{-1}\left(\frac{d_{MaxColId\ y}(x, y)}{d_{MaxColId\ x}(x, y)}\right) \quad \text{(Equation 13)}$$

Subscripts R, G, and B assigned to variables in above equations 10 through 13 indicate a case in which an input color image is an image having three elements RGB, but a different color space may also be used, such as YCbCr.

In such a case, presence or absence of correlation may be determined as shown in equation 14 below according to whether or not a MaxColId value (R or G or B) used in edge magnitude and edge direction calculation has the same value.

[10]

$$C_{v1,v2} = \begin{cases} 1, & \text{if MaxColId}_{v1} = \text{MaxColId}_{v2} \\ 0, & \text{else} \end{cases} \quad \text{(Equations 14)}$$

Figure 16:
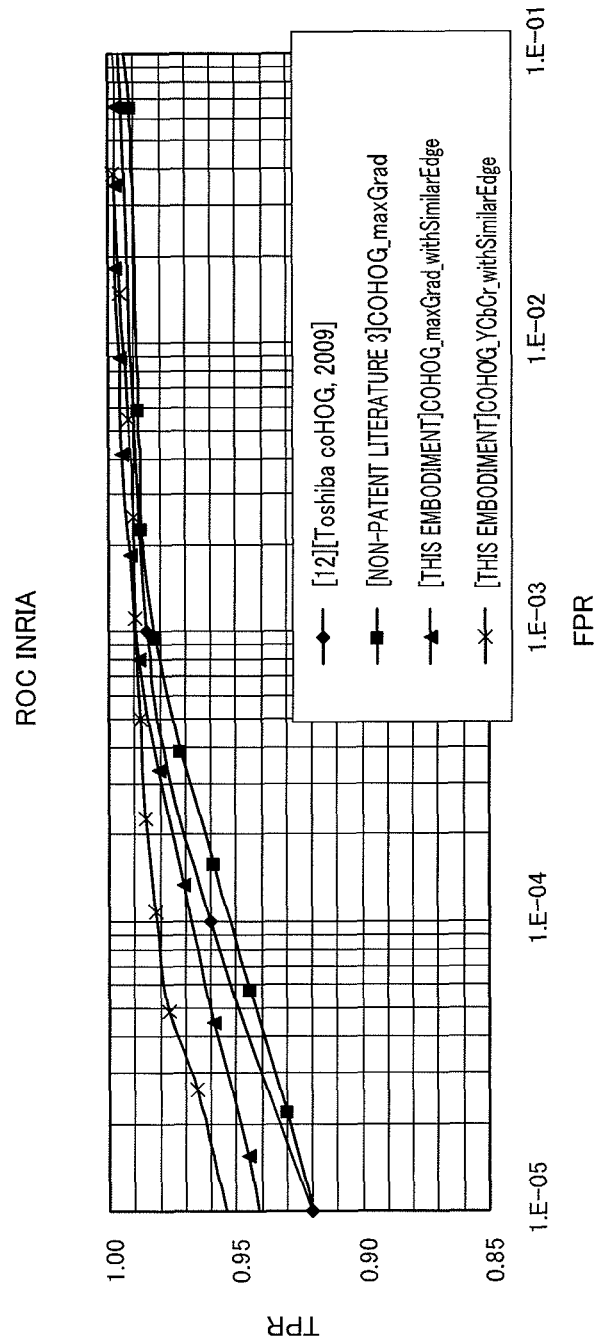
FIG. 16 is a drawing showing in chart form results of performing color space YCbCr accuracy efficacy verification using a feature amount calculation apparatus of above Embodiment 1.

FIG. 16 is a drawing showing in chart form results of performing color space YCbCr accuracy efficacy verification using feature amount calculation apparatus 100 of this embodiment. Chart 2 in FIG. 16 is an ROC curve, and indicates a false positive rate on the horizontal axis and a hit rate on the vertical axis.

Edge direction and edge correlation value calculation is performed for Y, Cb, and Cr channels in color space YCbCr and feature vectors are calculated for each, and when all are used, the performance indicated by "x" symbols in FIG. 16 is achieved, and performance further improves.

Performance can be significantly improved by performing feature value calculation in a YCbCr space in this way.

As described in detail above, according to this embodiment, feature amount calculation apparatus 100 is provided with feature value calculation section 110 that calculates an input image data pixel-unit feature value, feature amount calculation section 120 that combines the feature values of a plurality of pixels and calculates an inter-pixel feature amount, histogram creation section 130 that counts the feature values for each correlation value of pixels used in the feature value calculation, and creates the histogram as a feature vector, and histogram connection section 140 that connects feature vectors of all blocks. Also, feature amount calculation section 120 is provided with edge direction group calculation section 121 that calculates a group of edge directions, and correlation value calculation section 122 that takes all pixels or a predetermined pixel among the plurality of pixels as pixels subject to correlation value calculation and calculates a correlation value between the pixels subject to correlation value calculation.

According to such a configuration, inter-pixel correlation and connectivity are captured by utilizing a feature value and an inter-pixel correlation value whereby that feature value is calculated as feature information, and taking correlation into account. Capturing inter-pixel correlation and connectivity—that is, feature extraction for a pixel group (edge gradient group) with connectivity such as a silhouette shape of an object—becomes possible, noise due to a background can be suppressed, and object detection accuracy can be improved. Thus, feature vector extraction can be performed taking inter-pixel linkage and connectivity into consideration, and a feature amount that improves object detection accuracy can be generated.

It is also possible to represent an inter-pixel edge direction group as $(\theta_{v1}, d\theta_{v2-v1})$ using a relative angle rather than $(\theta_{v1}, \theta_{v2})$.

FIG. 21 through FIG. 23 are drawings explaining representation of an inter-pixel edge direction group as $(\theta_{v1}, d\theta_{v2-v1})$ using a relative angle.

FIG. 21 is a drawing explaining representation of an inter-pixel edge direction group as ($\theta_{v1}$, $\theta_{v2}$). Here, ($\theta_{v1}$, $\theta_{v2}$) is the same as for a conventional method coHOG.

Figure 21A:
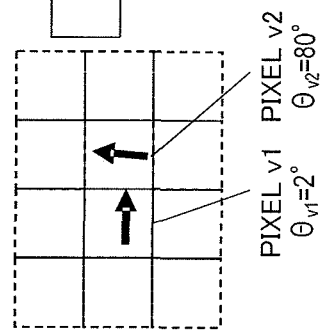
FIG. 21 is a drawing explaining representation of an inter-pixel edge direction group as $(\theta_{v1}, \theta_{v2})$ in feature amount calculation apparatuses according to the above embodiments.

As shown in FIG. 21A, feature value calculation section 110 performs calculation as an edge direction value of 0 to 360 degrees of each pixel in accordance with above equations 3 and 4. Pixel v1 and pixel v2 edge directions $\theta_{v1}$ and $\theta_{v2}$ are assumed to be 2° and 80° respectively.

Figure 21B:
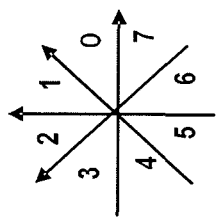

As shown in FIG. 21B, correlation value calculation section 122 or correlation value calculation section 222 (described later herein) quantizes 0 to 360 degrees into eight directions, and assigns each angle to a number from 0 to 7.

Figure 21C:
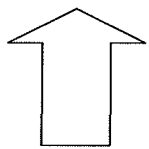

As shown in FIG. 21C, correlation value calculation section 122 or correlation value calculation section 222 (described later herein) can represent an inter-pixel edge direction group as ($\theta_{v1}$, $\theta_{v2}$)=(2°, 80°)=(0, 1).

FIG. 22 is a drawing explaining representation of an inter-pixel edge direction group as ($\theta_{v1}$, $d\theta_{v2-v1}$) using a relative angle. The method of representation by means of ($\theta_{v1}$, $d\theta_{v2-v1}$) using a relative angle is first disclosed in this embodiment.

As shown in FIG. 22A, feature value calculation section 110 performs calculation as an edge direction value of 0 to 360 degrees of each pixel in accordance with above equations 3 and 4. Pixel v1 and pixel v2 edge directions $\theta_{v1}$ and $\theta_{v2}$ are assumed to be 2° and 80° respectively.

As shown in FIG. 22B, correlation value calculation section 122 or correlation value calculation section 222 quantizes 0 to 360 degrees into eight directions, and assigns each angle to a number from 0 to 7. In particular, making pixel v1 edge direction $\theta_{v1}$=2° zero gives relative angle $d\theta_{v2-v1}$=80°−2°=78°⇒1.

As shown in FIG. 22C, correlation value calculation section 122 or correlation value calculation section 222 can represent an inter-pixel edge direction group as ($\theta_{v1}$, $d\theta_{v2-v1}$)=(2°, 78°=(0, 1).

FIG. 23 is a drawing explaining the difference between ($\theta_{v1}$, $\theta_{v2}$) and ($\theta_{v1}$, $\theta_{v2-v1}$) by giving an example.

Figure 23A:
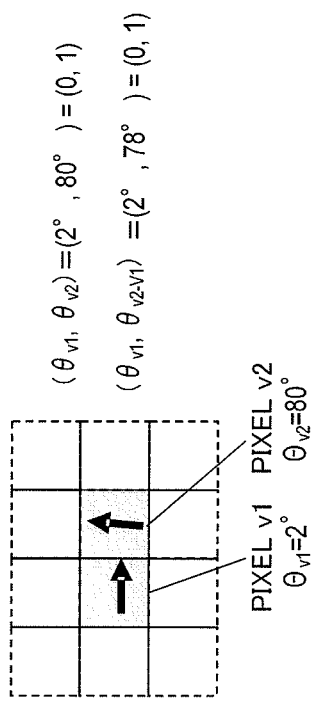
FIG. 23 is a drawing explaining the difference between $(\theta_{v1}, \theta_{v2})$ and $(\theta_{v1}, \theta_{v2-v1})$ in feature amount calculation apparatuses according to the above embodiments by giving an example.

As shown in example 1 in FIG. 23A, when the values of pixel v1 and pixel v2 edge directions $\theta_{v1}$ and $\theta_{v2}$ diverge ($\theta_{v1}$=2°, $\theta_{v2}$=80°), there is no difference whichever of ($\theta_{v1}$, $\theta_{v2}$) or ($\theta_{v1}$, $d\theta_{v2-v1}$) using a relative angle is used.

Figure 23B:
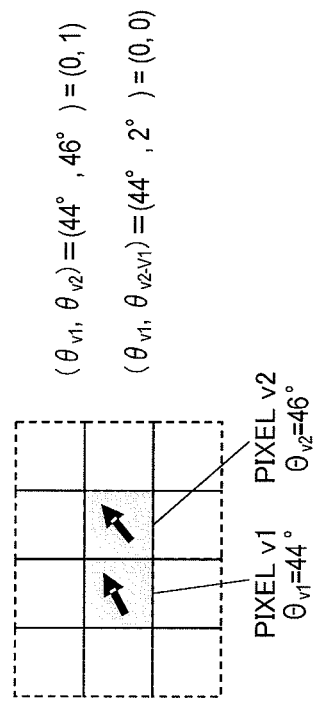

However, as shown in example 2 in FIG. 23B, when the values of pixel v1 and pixel v2 edge directions $\theta_{v1}$ and $\theta_{v2}$ are close ($\theta_{v1}$=44°, $\theta_{v2}$=46°), if ($\theta_{v1}$, $d\theta_{v2-v1}$) using a relative angle is used as an inter-pixel edge direction group, pixel gradient similarity can be converted to a numerical form more accurately.

Embodiment 2

Embodiment 2 is an example of a case in which a feature type that constructs a histogram feature is not an edge direction value, but a feature such as an LBP (Local Binary Pattern) feature is used.

Figure 17:
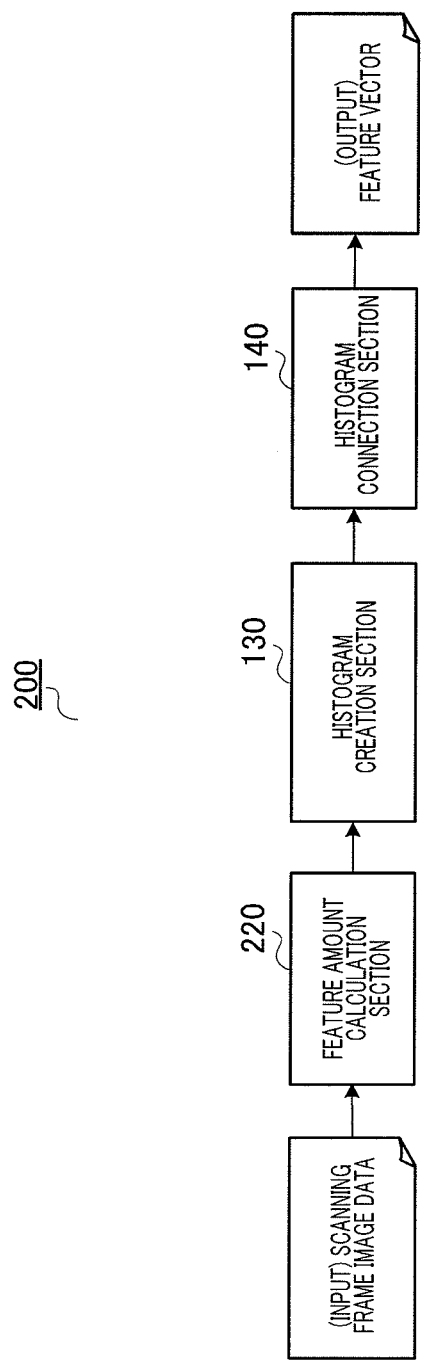
FIG. 17 is a block diagram showing the configuration of a feature amount calculation apparatus according to Embodiment 2 of the present invention.

FIG. 17 is a block diagram showing the configuration of a feature amount calculation apparatus according to Embodiment 2 of the present invention. Parts in FIG. 17 identical to those in FIG. 5 are assigned the same reference codes as in FIG. 5, and duplicate descriptions thereof are omitted here.

As shown in FIG. 17, feature amount calculation apparatus 200 is provided with feature amount calculation section 220, histogram creation section 130, and histogram connection section 140.

Feature amount calculation section 220 calculates an LBP feature from input image data, and combines the LBP features of a plurality of pixels and calculates an inter-pixel feature amount.

Figure 18:
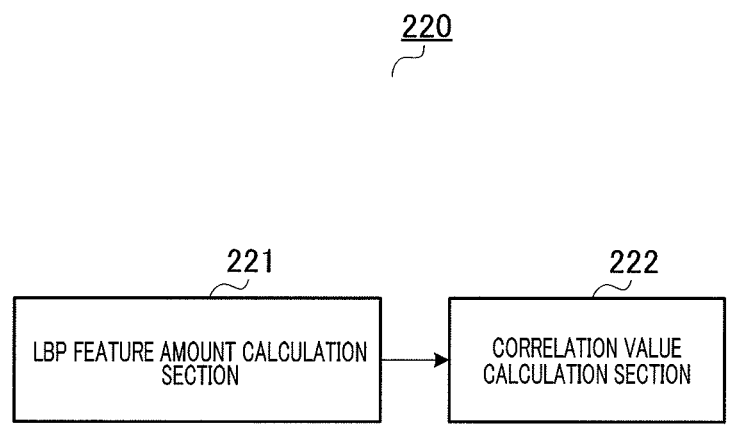
FIG. 18 is a block diagram showing the configuration of a feature amount calculation section of a feature amount calculation apparatus according to above Embodiment 2.

FIG. 18 is a block diagram showing the configuration of a feature amount calculation section of feature amount calculation section 220.

As shown in FIG. 18, feature amount calculation section 220 is provided with LBP feature amount calculation section 221 and correlation value calculation section 222.

LBP feature amount calculation section 221 calculates an LBP feature amount.

Of a plurality of pixels used in the LBP feature amount calculation, correlation value calculation section 222 makes a pixel group in which 0 and 1 are reversed in an LBP bit string, or a pixel group in which 0 and 1 are reversed and a center pixel, pixels subject to correlation value calculation, and calculates correlation between pixels subject to correlation value calculation.

Feature amount calculation section 220 performs the processing in FIG. 20A described later herein in block units.

The operation of feature amount calculation apparatus 200 configured as described above will now be explained.

FIG. 19 is a drawing explaining an LBP feature.

As shown in FIG. 19A, with an LBP, a certain pixel is taken as the center and the pixel value is compared with neighboring pixels, 1 is set if a neighboring pixel is larger than the center pixel and 0 is set otherwise (see FIG. 19B), and a bit string in which these neighboring pixel 0 or 1 values are sequenced is taken as a feature value (see FIG. 19C).

With a conventional LBP feature, to what extent a bit string sequence such as shown in FIG. 19 is represented in a local area is converted to a histogram and made a feature vector. Here too, the same kind of process as described above can be implemented, and the same kind of effect obtained, by using edge magnitude and pixel value correlation of pixels in which 0s and 1s of an LBP bit string are reversed or pixels in which 0s and 1s are reversed and a center pixel.

FIG. 20 is a flowchart showing processing by feature amount calculation apparatus 200. Processing steps in FIG. 20 identical to those in FIG. 13 are assigned the same step numbers as in FIG. 13.

Figures 20A, 20B:
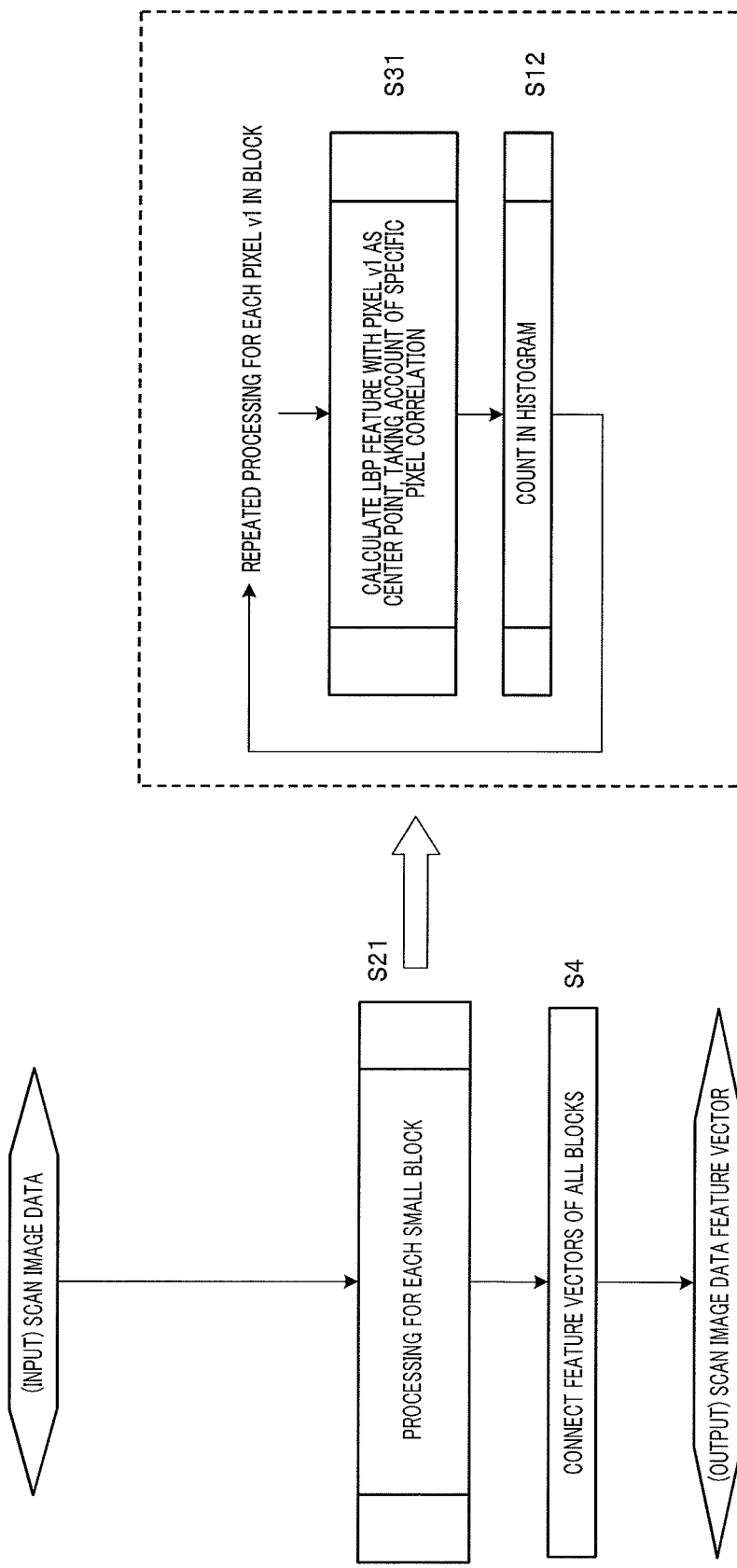
FIG. 20 is a flowchart showing processing by a feature amount calculation apparatus according to above Embodiment 2.

As shown in FIG. 20A, when scan image data is input, in step S21 feature amount calculation section 220 performs processing for each small block. At this time, feature amount calculation section 220 also performs division into small blocks.

In step S4, histogram connection section 140 connects feature vectors of all blocks, outputs a scan image data feature vector, and terminates this processing flow.

FIG. 20B is a flowchart showing in detail the processing for each small block in above step S21. Feature amount calculation section 220 repeats performing processing for each pixel v1 in a block. First, in step S31, LBP feature amount calculation section 221 and correlation value calculation section 222 of feature amount calculation section 220 calculate an LBP feature for each pixel v in a block with pixel v1 as a center point, taking account of specific pixel correlation.

In step S12, histogram creation section 130 counts a calculated edge direction group and correlation value in a histogram, and returns to above step S11. In this way, feature amount calculation section 220 is repeatedly involved in processing for each pixel in a block within the dotted-line frame in FIG. 20B.

According to this embodiment, feature amount calculation apparatus 200 is provided with feature amount calculation section 220 that calculates an LBP feature from input image data, and calculates a new feature amount taking account of correlation of a plurality of pixels referenced when performing LBP feature calculation. In feature amount calculation section 220, LBP feature amount calculation section 221 calculates an LBP feature amount, and of a plurality of pixels used in LBP feature amount calculation, correlation value calculation section 222 makes a pixel group in which 0 and 1 are reversed in an LBP bit string, or a pixel group in which 0 and 1 are reversed and a center pixel, pixels subject to correlation value calculation, and calculates correlation between pixels subject to correlation value calculation.

In this embodiment, by using edge magnitude and pixel value correlation of pixels in which 0s and 1s of an LBP bit string are reversed or pixels in which 0s and 1s are reversed and a center pixel, the same kind of effect is achieved as in Embodiment 1—that is, an inter-pixel relationship and connectivity are captured by utilizing a feature value and an inter-pixel correlation value whereby that feature value is calculated as feature information, and taking account of correlation. Inter-pixel correlation and connectivity can be captured. Therefore, feature extraction for a pixel group (edge gradient group) with connectivity, such as a silhouette shape of an object, becomes possible, noise due to the background can be suppressed, and object detection accuracy can be improved. Thus, feature vector extraction can be performed taking inter-pixel linkage and connectivity into consideration, and a feature amount that improves object detection accuracy can be generated.

LBP feature amount calculation section 221 may, of course, also perform feature amount calculation for each channel of a YCbCr space in the same way as in Embodiment 1.

The above description presents examples of preferred embodiments of the present invention, but the scope of the present invention is not limited to these. The present invention can be applied to any kind of apparatus as long as it is an electronic device having a feature amount calculation apparatus that calculates a feature amount of a target object from image data.

A feature amount calculation apparatus and method of the present invention have, as a first feature and effect, capturing an edge series and edge amplitude relationship utilizing inter-pixel correlation. As a feature value, an edge direction based histogram may be used, or a histogram feature based on something like LBP or suchlike pixel value gradient information may be used. The following is LBP-related reference literature.

LBP-related reference literature: Face detection with local binary patterns: Application to face recognition. IEEE Trans. Pattern Anal. Mach. Intell., 2037-2041, 2006

In the above embodiments, the term "feature amount calculation apparatus" has been used, but this is simply for convenience of description, and terms such as "object detection apparatus" and "object detection method" or the like may also be used for an apparatus and method respectively.

An above-described feature amount calculation apparatus is also implemented by means of a program for causing this feature amount calculation method to function. This program is stored in a computer-readable storage medium.

The disclosure of Japanese Patent Application No. 2010-65246, filed on Mar. 19, 2010, including the specification, drawings and abstract, is incorporated herein by reference in its entirety.

INDUSTRIAL APPLICABILITY

A feature amount calculation apparatus and feature amount calculation method according to the present invention are effective in discriminating a target object with a high degree of accuracy, and are suitable for use in an object detection apparatus or object tracking apparatus using image features or the like. Possible uses include video monitoring systems when a detection object is a person, animal, or the like, vehicle driving support systems, automatic annotation systems for images and video, and so forth.

REFERENCE SIGNS LIST 100, 200 Feature amount calculation apparatus
110 Feature value calculation section
120, 220 Feature amount calculation section
121 Edge direction group calculation section
122, 222 Correlation value calculation section
130 Histogram creation section
140 Histogram connection section
221 LBP feature amount calculation section

The invention claimed is:

1. A feature amount calculation apparatus that calculates a feature amount of a target object from image data, the feature amount calculation apparatus comprising:
   a feature value calculator that calculates an edge direction and an edge magnitude as input image data pixel-unit feature values;
   an edge direction group calculator that combines the edge directions of a plurality of pixels and calculates an edge direction group as an inter-pixel feature amount;
   a correlation value calculator that takes all pixels or predetermined pixels of the plurality of pixels used in the feature value calculation as pixels subject to correlation value calculation, and calculates a correlation value of the edge magnitudes between the pixels subject to correlation value calculation for each feature amount; and
   a histogram creator that counts the feature amounts in a histogram for each correlation value, and creates the histogram as a feature vector, wherein:
   the edge direction group calculator calculates a group of edge direction values of a plurality of pixels in a predetermined space-time arrangement relationship as the feature amount; and
   the correlation value calculator takes the plurality of pixels used in calculation of the feature amount as the pixels subject to correlation value calculation.

2. A feature amount calculation apparatus that calculates a feature amount of a target object from image data, the feature amount calculation apparatus comprising:
   a feature value calculator that calculates an edge direction and an edge magnitude as input image data pixel-unit feature values;
   an edge direction group calculator that combines the edge directions of a plurality of pixels and calculates an edge direction group as an inter-pixel feature amount;
   a correlation value calculator that takes all pixels or predetermined pixels of the plurality of pixels used in the feature value calculation as pixels subject to correlation value calculation, and calculates a correlation value of the edge magnitudes between the pixels subject to correlation value calculation for each feature amount; and
   a histogram creator that counts the feature amounts in a histogram for each correlation value, and creates the histogram as a feature vector, wherein the correlation value calculator calculates:
   a pixel value difference between the pixels subject to correlation value calculation;
   an edge magnitude value difference between the pixels subject to correlation value calculation; and
   the correlation value, using a space-time distance between the pixels subject to correlation value calculation, or a group of space-time distances between the pixels subject to correlation value calculation.

3. A feature amount calculation apparatus that calculates a feature amount of a target object from image data, the feature amount calculation apparatus comprising:
- a feature value calculator that calculates an edge direction and an edge magnitude as input image data pixel-unit feature values;
- an edge direction group calculator that combines the edge directions of a plurality of pixels and calculates an edge direction group as an inter-pixel feature amount;
- a correlation value calculator that takes all pixels or predetermined pixels of the plurality of pixels used in the feature value calculation as pixels subject to correlation value calculation, and calculates a correlation value of the edge magnitudes between the pixels subject to correlation value calculation for each feature amount; and
- a histogram creator that counts the feature amounts in a histogram for each correlation value, and creates the histogram as a feature vector, wherein, when the input image data is a color image,
- the feature amount calculator calculates the edge direction value and the edge magnitude value for every three element values of the color image data for a plurality of pixels in a predetermined space-time arrangement relationship from the color image;
- the edge direction group calculator calculates an element edge direction group for which the edge magnitude value is a maximum value as the feature amount; and
- the correlation value calculator calculates the correlation value based on whether or not which of three elements of the color image data a maximum edge magnitude is obtained from among the edge magnitude values in the plurality of pixels matches.

4. A feature amount calculation apparatus that calculates a feature amount of a target object from image data, the feature amount calculation apparatus comprising:
- a feature value calculator that calculates an edge direction and an edge magnitude as input image data pixel-unit feature values;
- an edge direction group calculator that combines the edge directions of a plurality of pixels and calculates an edge direction group as an inter-pixel feature amount;
- a correlation value calculator that takes all pixels or predetermined pixels of the plurality of pixels used in the feature value calculation as pixels subject to correlation value calculation, and calculates a correlation value of the edge magnitudes between the pixels subject to correlation value calculation for each feature amount; and
- a histogram creator that counts the feature amounts in a histogram for each correlation value, and creates the histogram as a feature vector, wherein
- the feature value calculator calculates the edge direction and edge magnitude for each pixel in a frame of the input image data; and
- the correlation value calculator calculates the correlation value of the edge magnitudes between the pixels in the frame.

5. A feature amount calculation method that calculates a feature amount of a target object from image data, the feature amount calculation method comprising:
- calculating an edge direction and an edge magnitude as input image data pixel-unit feature values;
- combining the edge directions of a plurality of pixels and calculating an edge direction group as an inter-pixel feature amount;
- taking all pixels or predetermined pixels of the plurality of pixels used in the feature value calculation as pixels subject to correlation value calculation, and calculating a correlation value of the edge magnitudes between the pixels subject to correlation value calculation for each feature amount; and
- counting the feature amounts in a histogram for each correlation value, and creating the histogram as a feature vector, wherein
- the edge direction and edge magnitude are calculated for each pixel in an frame of the input image data; and
- the correlation value of the edge magnitudes between the pixels in the frame is calculated.

* * * * *